United States Patent [19]

Dirr

[11] Patent Number: 5,050,188
[45] Date of Patent: Sep. 17, 1991

[54] METHOD AND APPARATUS FOR TRANSMITTING CODED INFORMATION

[76] Inventor: Josef Dirr, Neufahrner Str. 5, D-8000 Munich 80, Fed. Rep. of Germany

[21] Appl. No.: 203,710

[22] Filed: Jun. 7, 1988

[30] Foreign Application Priority Data

Jun. 12, 1987 [DE] Fed. Rep. of Germany ....... 3719670
Feb. 19, 1988 [DE] Fed. Rep. of Germany ....... 3805263

[51] Int. Cl.$^5$ ............................................. H04L 27/28
[52] U.S. Cl. ....................................... 375/38; 370/24; 358/13
[58] Field of Search .................. 370/24, 27, 29, 30, 370/32, 20; 375/39, 61, 22, 24, 37, 38, 41; 358/12, 13, 16

[56] References Cited
U.S. PATENT DOCUMENTS

| | | | |
|---|---|---|---|
| 3,796,831 | 3/1974 | Bauer | 375/22 |
| 4,380,062 | 4/1983 | Stuart et al. | 370/24 |
| 4,464,767 | 8/1984 | Bremer | 370/20 |
| 4,534,040 | 8/1985 | Thapar | 375/39 |
| 4,571,549 | 2/1986 | Lods et al. | 375/39 |
| 4,675,721 | 6/1987 | Dirr | 375/39 |
| 4,731,798 | 3/1988 | Dirr | 375/39 |
| 4,794,621 | 12/1988 | Dirr | 375/52 |

Primary Examiner—Stephen Chin
Attorney, Agent, or Firm—Henry C. Nields

[57] ABSTRACT

In the transmission of information, particularly long-distance speech signals, between a first and a second station, the information is transmitted from the first to the second station by means of a code alternating current of predetermined frequency and phase-state, and from the second station to the first station by means of a code alternating current which has the predetermined frequency and a phase shifted by 90° with respect to the predetermined phase. The phase of the code alternating current transmitted from the second to the first station can be driven by means of the phase of the code alternating current transmitted from the first to the second station. The code alternating currents may contain code elements in the form of half waves or periods of differentiated amplitudes of the code alternating current, which is essentially sinusoidal. In order to use multiplication, two code-alternating-currents, whose phases are shifted by 90° will respect to each other, can be combined into one sum alternating current of the resulting phase, and to this sum alternating current at least one further code alternating current can be added, whose phase is shifted by 90° with respect to the resulting phase of the sum alternating current. The addition of further code alternating currents can be repeated, as long as the error-frequency during demodulation at the receiving end remains sufficiently low.

21 Claims, 15 Drawing Sheets

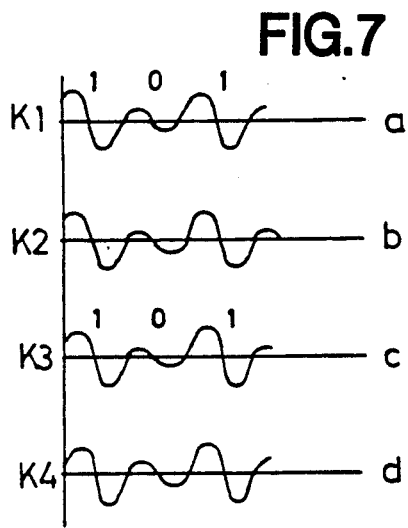
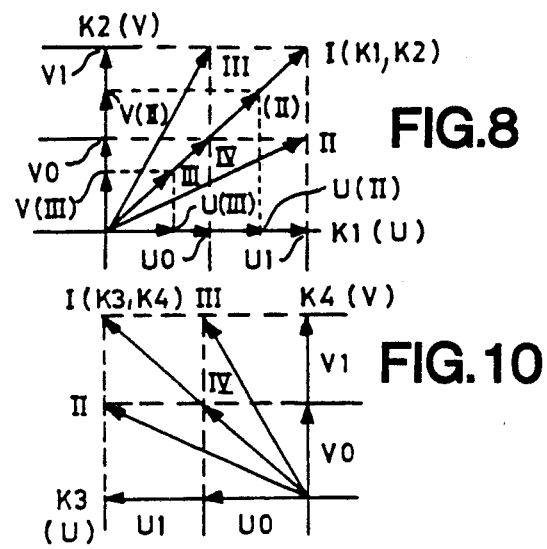
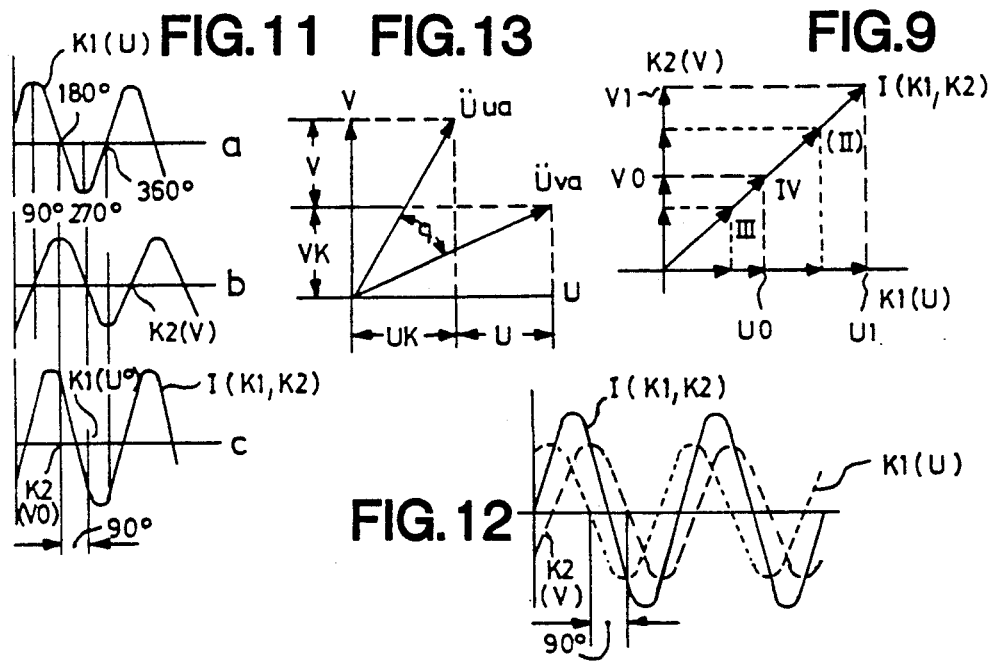
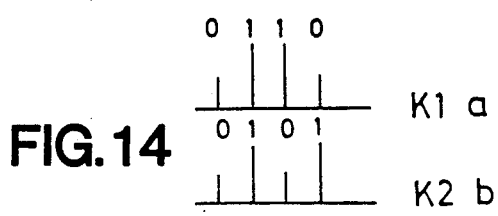

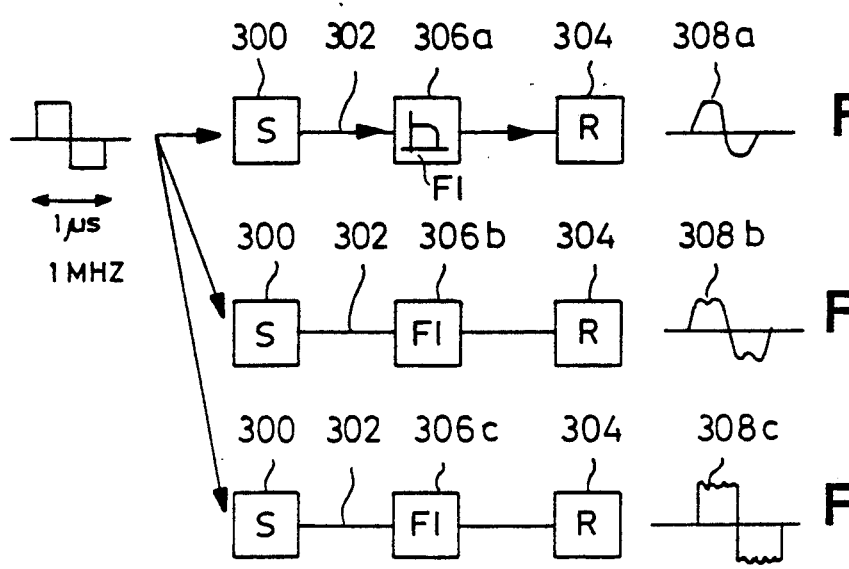
FIG. 19a
FIG. 19b
FIG. 19c
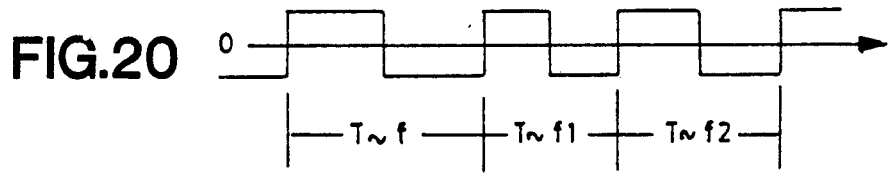
FIG. 20
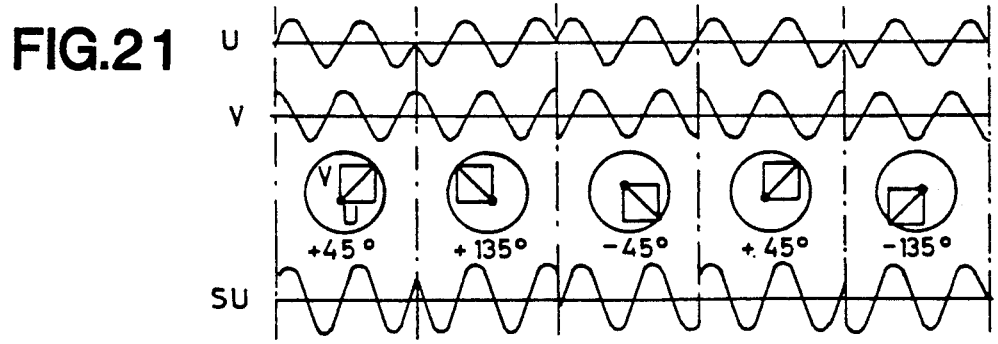
FIG. 21

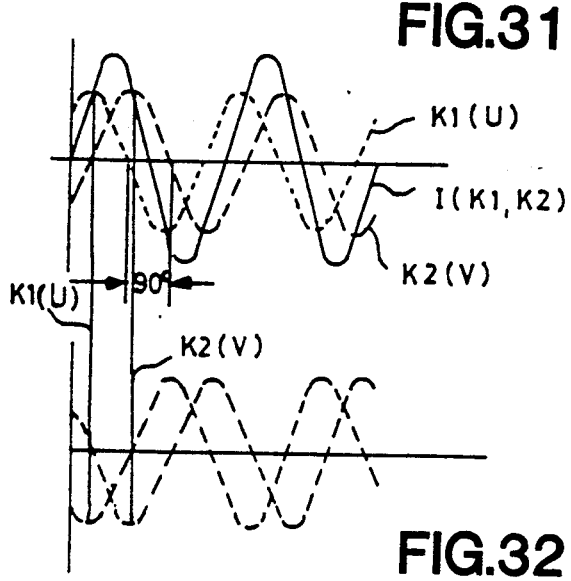
FIG.31
FIG.32
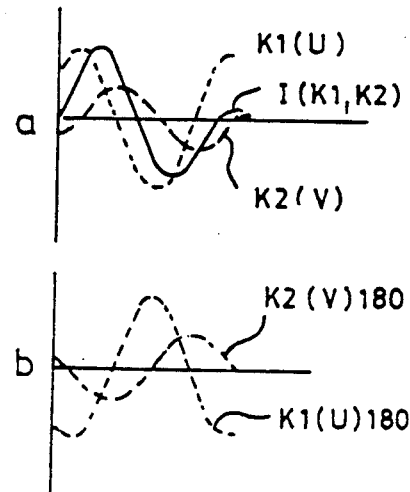
FIG.33
FIG.34
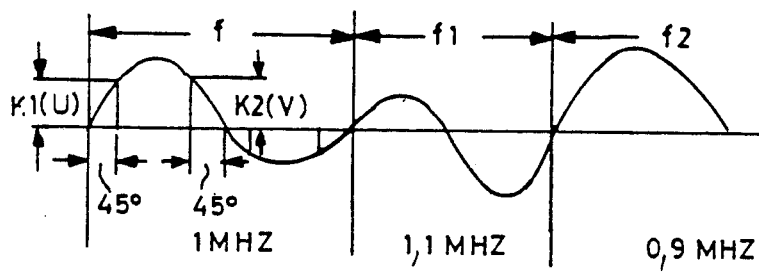
FIG.30
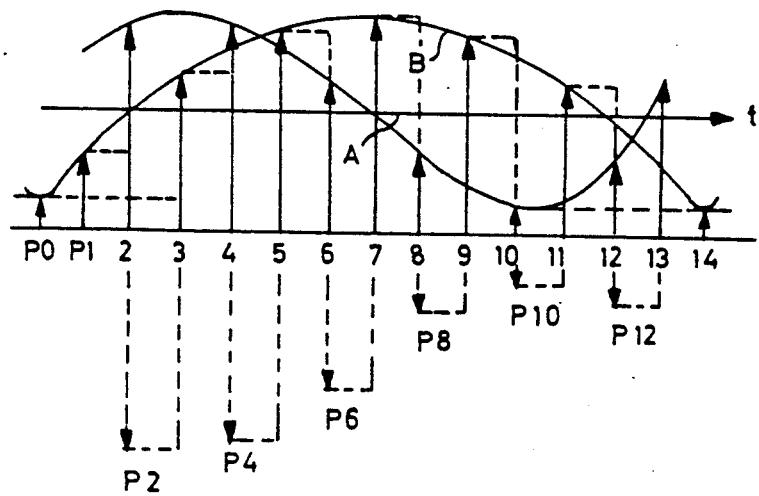
FIG.40

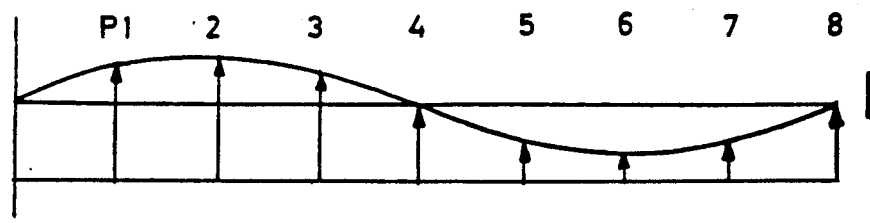
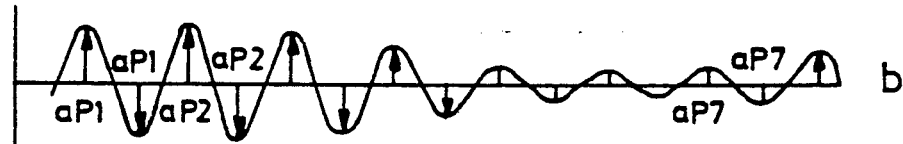
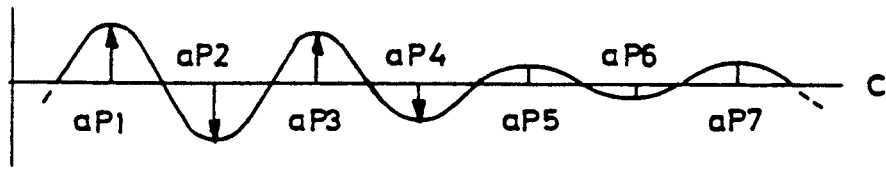
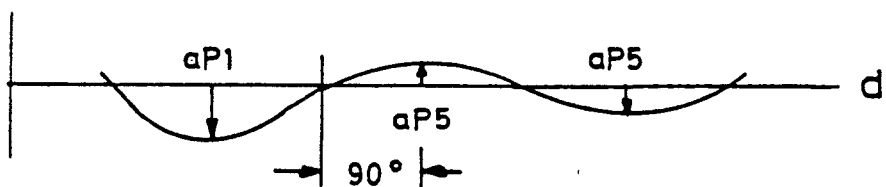
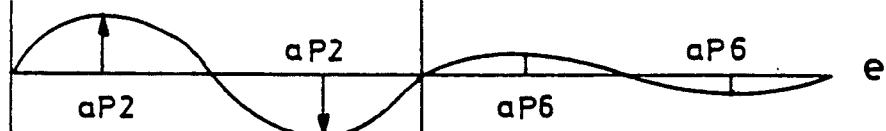
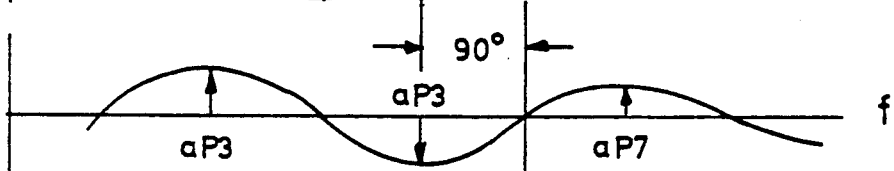
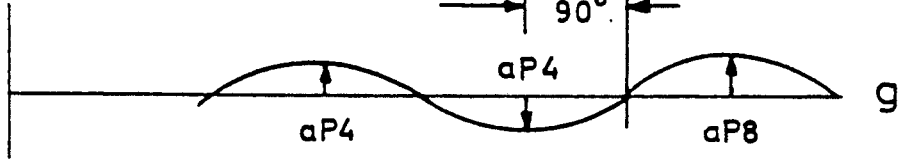
FIG.36
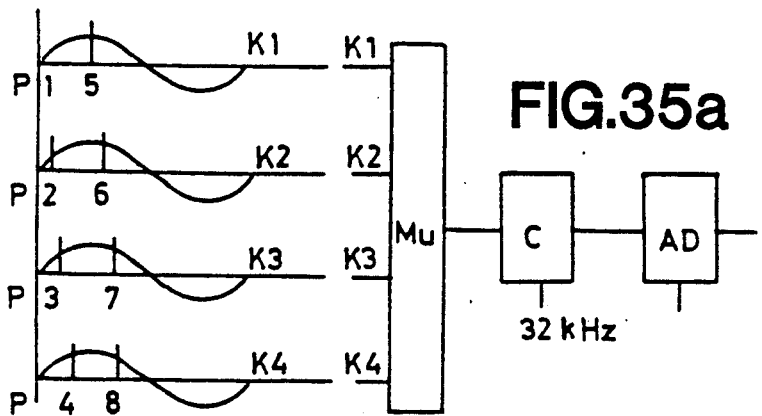
FIG.35a

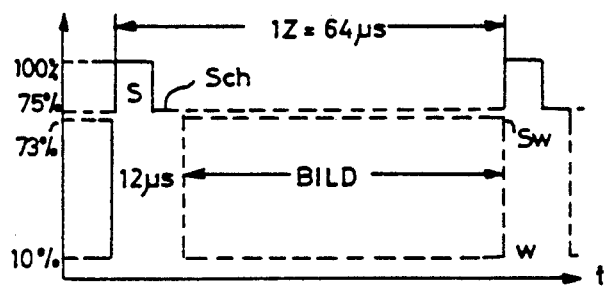
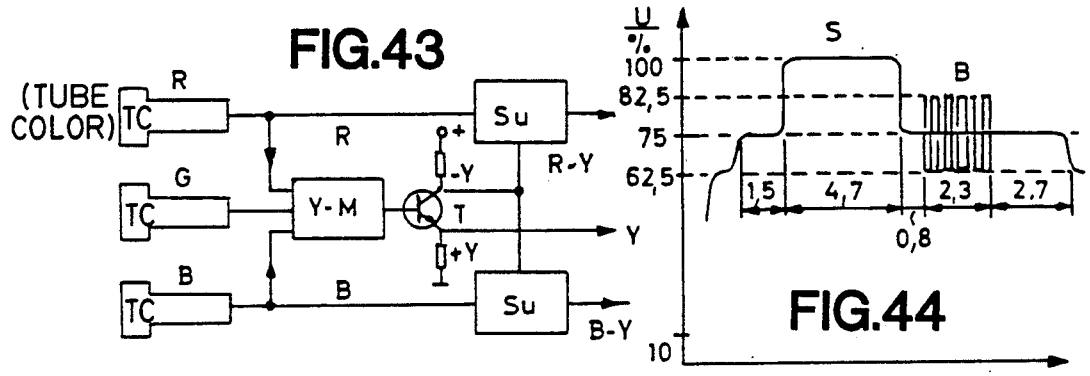
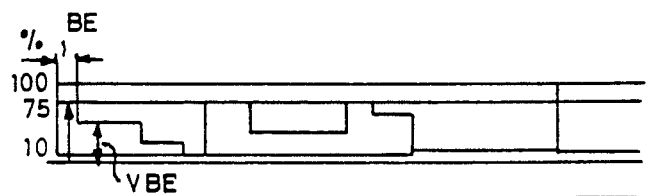
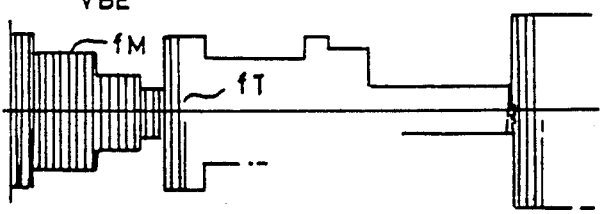
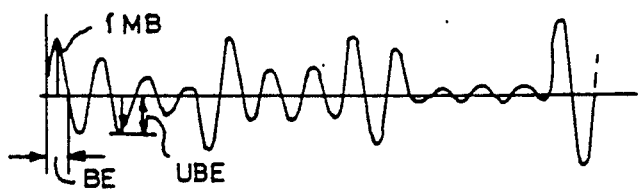

METHOD AND APPARATUS FOR TRANSMITTING CODED INFORMATION

FIELD OF THE INVENTION

The present invention relates to methods and apparatuses for the coding of information and transmission of coded information, especially by pulse-amplitude-modulation (PAM) or pulse-code-modulation (PCM), wherein the code elements are presented by half-waves or periods of an alternating current.

BACKGROUND OF THE INVENTION

From my U.S. Pat. No. 4,675,721 (incorporated by reference thereto) there is known a method in which the pulses (code-elements) occurring in PAM or PCM are coded by the amplitudes of half-waves or periods of an alternating current, which are transmitted in an uninterrupted sequence of positive and negative half-waves. If is further known, to unite additively two code-alternating-currents of this type, whose phases are displaced by 90° with respect to each other, and then to transmit the combined oscillation which arises thereby.

In another known method, which is known as quadrature amplitude modulation (QAM), the code symbols of a code alphabet are represented by distinct combinations of amplitude- and phase-values.

It is further known from European patent application 110,421 to reduce the frequency of a code-alternating current, e.g. by one fourth, by taking samples in the time-multiplex-method with 90° phase displacement and transmitting upon the half-waves or periods of four code alternating currents displaced in phase by 90° with respect to each other, of which then two can again be added. The frequency of these four code alternating currents is then only one quarter of the frequency of the original single code alternating current.

BRIEF SUMMARY OF THE INVENTION

It is an object of the present invention to suggest methods and apparatuses with which more information can be transmitted with only one alternating current signal than is the case with known methods and apparatuses.

A further object of the invention consists in the suggestion of methods and apparatuses for duplex transmission of information, especially telephone conversations.

In a preferred embodiment of the invention at least two code alternating currents are added and a further code alternating current (or a further summed-alternating-current, which is produced by the addition of code-alternating-currents) are so positioned with respect to their phase, that they can be added again. A further characteristic of the invention consists in the fact that code alternating currents displaced in phase by 90° with respect to each other are used in duplex operation.

The invention can be used with long-distance connections or other information terminals in simplex- or duplex-operation with one or with several channels connected by time-multiplex, or, further, with star selector switches, with data transmission as well as with analog or digital speech transmission. The invention can be used to particular advantage in radio and television.

Further objects, aspects or characteristics and advantages of the invention will appear from the following description of preferred examples.

BRIEF DESCRIPTION OF THE DRAWINGS

FIG. 7 shows a binary coded code alternating current;

FIG. 8 is a vector diagram of alternating currents which arise by summation of primary code alternating currents;

FIG. 9 is a vector diagram for the explanation of a modified encoding method;

FIG. 10 is a vector diagram similar to FIG. 8, which shows the phases and amplitudes of additional summed alternating currents;

FIGS. 11 and 12 are diagrams for the explanation of the summation of code alternating currents;

FIG. 13 is a diagram for the explanation of the phase angle alteration which arises upon addition of alternating currents according to FIG. 7;

FIG. 14 is a diagram for the explanation of a quaternary encoding;

FIGS. 19a through 19c are block circuit diagrams of transmission systems;

FIG. 20 shows periods of a rectangular oscillation;

FIG. 21 shows oscillations phase modulated in a known manner;

FIG. 30 shows a code alternating current;

FIGS. 31, 32, 33 and 34 show wave forms of code signals;

FIG. 35a shows a multiplex circuit;

FIG. 36a–g show the wave forms for the explanation of a method of frequency reduction during transmission of coded signals;

FIG. 40 shows two stereo signals A and B;

FIGS. 42a through 42c and FIG. 38c show television signals;

FIG. 43 shows a coded television signal according to the invention;

FIG. 44 shows the wave form of a part of a known television signal;

In FIG. 1 there is shown a two-way telephone system according to a first aspect of the present invention. The system according to FIG. 1 consists of two stations 12, 14, which are connected with each other by a long-distance two-wire line 16 or some other transmission path. One station contains a first microphone 18a, the output of which is coupled to an encoder 20a. The encoder 20a is a pulse code modulator, which samples the analog speech oscillation signal of the microphone 18a with a frequency of 32 kHz, and translates the thus obtained signal samples in the usual manner into binary signal words. The signal words consist of corresponding combinations of binary zeros and ones, which in the embodiment of the invention shown in FIG. 1 are represented by a prescribed small or a prescribed large amplitude of an oscillation of a substantially sinusoidal alternating current, as will be explained in more detail hereinafter with reference to FIG. 7. The first encoder 20a is coupled with a quartz oscillator 21, which fixes the frequency of the sinusoidal code alternating current, as will be explained with respect to FIG. 6. Of course, one can also use other encoders, and one can also use as code elements the half-waves of a continuous code alternating current, as described in the aforementioned U.S. Pat. No. 4,675,721. Modified embodiments work with pulse amplitude modulation or other encoding methods; it is nevertheless essential that the encoder deliver an essentially continuous sinusoidal output signal, or an output signal which can be converted into a substantially sinusoidal signal by filtering or the like.

Figure 1:
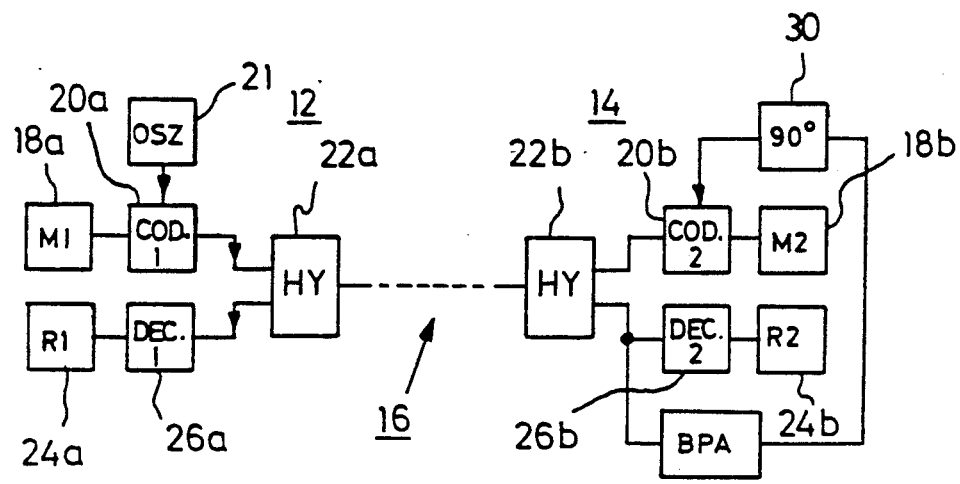
FIG. 1 is a block circuit diagram of a telephone transmission system according to one preferred embodiment of the invention.

The output of the encoder is connected to an input of a fork connection circuit 22a, which has an output connected to the conductor 16.

The station 12 contains further a telephone receiver 24a (or another receiving apparatus, such as an amplifier with loudspeaker) and a decoder 26a. The input of the decoder 26a is connected to a further output of the fork connection 22a and the output of the decoder 26a is connected to the input of the telephone receiver 24a.

The station 14 contains, like station 12, a microphone 18b, an encoder 20b, a fork connection circuit 22b, a telephone receiver 24b and a decoder 26b, which are connected like the corresponding components of station 12. The station 14 contains in addition a band-pass filter amplifier 28 with an input which is connected to the output of the decoder 26b, and with an output which is connected to the input of a 90°-phase-shifter 30. The output of the phase-shifter 30 is coupled with a carrier- or synchronizer-input 32 of the encoder 20d.

In the apparatus according to FIG. 1 the quartz oscillator 21 is the frequency-determining part, which determines the frequency of the code alternating current. At the station 14 this function is realized by the band-pass filter amplifier 28 and the phase shifter 30. The code alternating current, which reaches the conductor 16 of the station 14, is thus shifted in phase by 90° with respect to the code alternating current which is delivered from the encoder 20a to the conductor 16. The code alternating currents can not mutually influence each other at the conductor 16 because of their phase displacement of 90°, so that the demands upon the fork connection circuit 22a, 22b can be substantially reduced or these fork connection circuits can be entirely eliminated.

Figure 2:
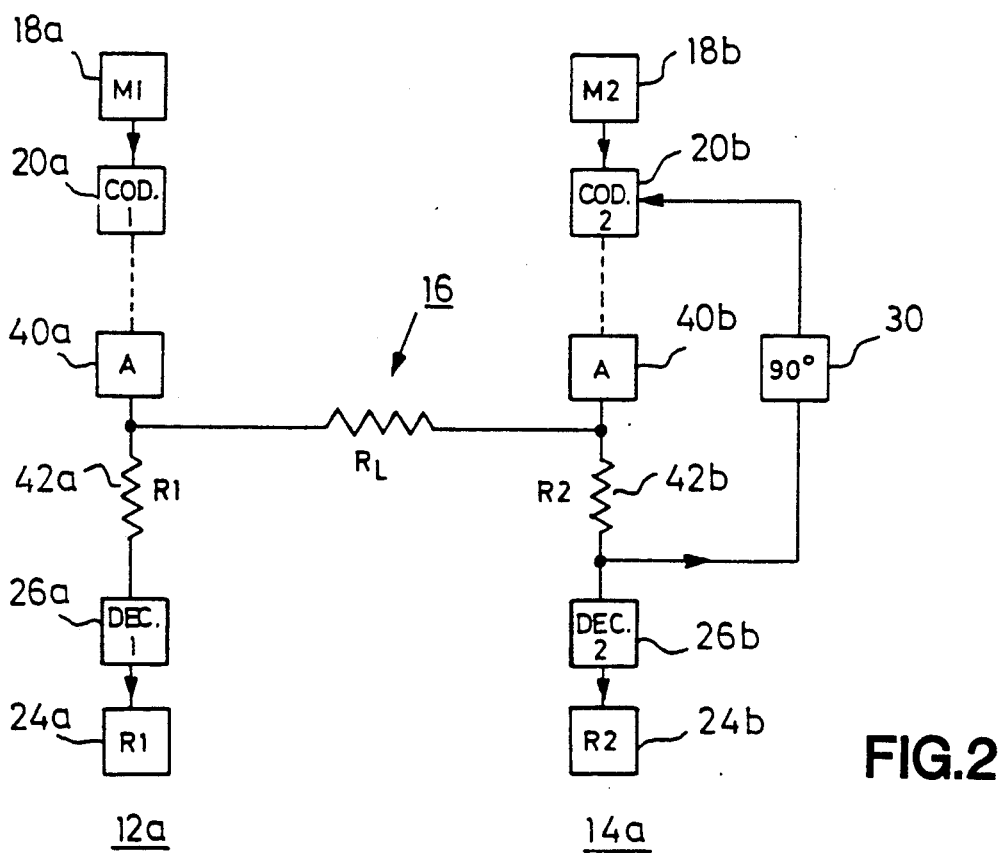
FIG. 2 is a circuit diagram, partly in block form, of another embodiment of a long distance system according to the invention.

FIG. 2 shows a variation of the circuit according to FIG. 1, wherein corresponding parts are designated by the same reference numbers. Here the fork connection circuits are omitted and the output of the encoder 20a is connected to one end of the line 16 (which is represented by a line resistance $R_L$) via an amplifier 40. Between the said end of the line 16 and the receiver-decoder 26a a resistance 42a is connected, which is designated by $R_1$. The station 14 is constructed correspondingly and contains an amplifier 40b (which is connected between the encoder 20b and the other end of the line 16) as well as a resistance 42b (designated by $R_2$) which is connected between the second end of the line 16 and the decoder 26b. The output of the decoder 26b is again connected with the synchronization input of the encoder 20b via a connection which contains a 90°-phase shifter 30. The resistances $R_1$, $R_2$ are adapted to the line attenuation $R_L$.

The circuits according to FIGS. 1 and 2 may be varied in that a central synchronization of both encoders 20a, 20b results with alternating currents which originate from a common source, yet are shifted in phase by 90° with respect to each other.

Figure 3:
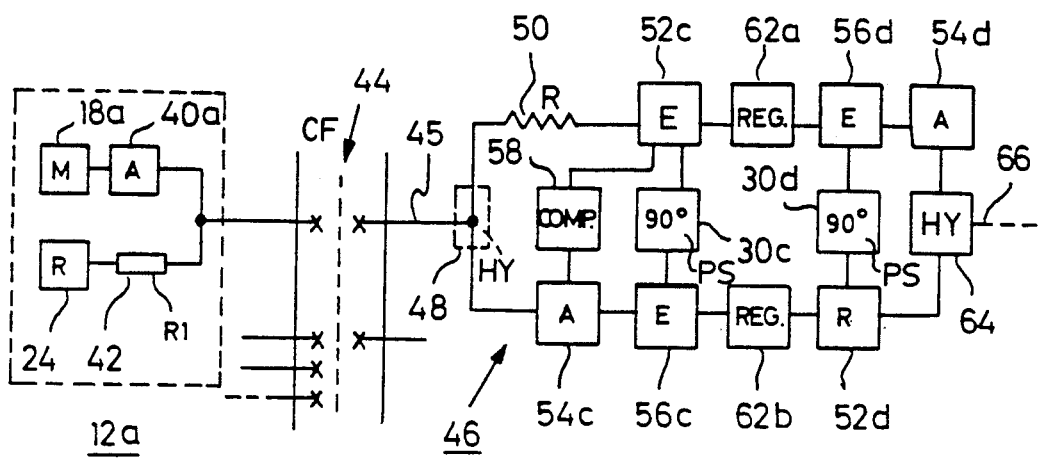
FIG. 3 is a block circuit diagram of a part of a long-distance intermediate system according to one embodiment of the invention.

In FIG. 3 there is shown the principle explained with the aid of FIG. 2 in use with an intermediate for a long distance network. Station 12a (shown by a dashed-line block), which can be constructed similarly to FIG. 2 and contains a microphone 18a, an amplifier 40a, a telephone receiver 24 as well as a resistance 42, is coupled with an intermediate station 46 via a coupling-field 44 and a line 16. The line 45 from the distribution field 44 is coupled on the one hand with a receiver unit 52c via a resistance 50 corresponding to the resistance $R_1$ and on the other hand with a sending unit 56c via an amplifier 54c. Receiver unit and sending unit 52, 56 are coupled by means of a 90° phase shifter 30, analogous to unit 14 in FIG. 2. The receiver unit 52c can contain an amplifier as well as an encoder and can be coupled with the amplifier 54c via a compensation circuit 58. The output of the receiver unit 52c is coupled with a second sending unit 56d via a regenerative circuit 62a and the second sending unit 56d is coupled with a fork connection circuit 64 via an amplifier 54d. A trunk line 66 is connected to the output of the fork connection circuit 64. The sending unit 56c is coupled with a receiving unit 52d via a regenerative circuit 62b, and the receiving unit 52d is connected to the fork connection circuit 64 and receives from the sending unit 56d via a phase shifter 30d a synchronizing alternating current which is shifted in phase 90°. The manner of operation of the circuit according to FIG. 3 should be clear because of the explanation of FIGS. 1 and 2.

If the line 45 is connected with the resistance 50 and the amplifier 54c via a fork connection circuit 48 sketched into FIG. 3 in broken lines, in principle no compensation is required. In operation a code alternating current of predetermined phase goes from the unit 46 to the remote line 66, and from a corresponding station (not shown) at the other end of the remote line comes a code alternating current whose phase is shifted by 90° with respect to that of the outgoing code alternating current. The incoming code alternating current goes via the fork connection 64 to the receiver 52d, then via the regenerator 62b to the sending unit 56c, further via the amplifier 54 and the line 46, the distribution field(s) 44 and the line 16 to the subscriber station 12a. There the code alternating current is converted into an analog speech signal by means of a decoder corresponding to the decoder 26a in FIG. 1 and conducted to the earphones 24a. From time to time a code alternating current is extracted for the sending unit from the receiving unit via 90° phase shifters. As already mentioned, the feeding of the code alternating current can also be done centrally from the intermediate location. Even the code alternating current of the participants can be synchronized from the intermediate location out. In long distance transmission there is always a guiding member. The sending unit of the opposite member is then fed from the receiving unit of the opposite member.

In remote lines a grouping can advantageously be undertaken with the aid of time multiplexers.

Figure 4:
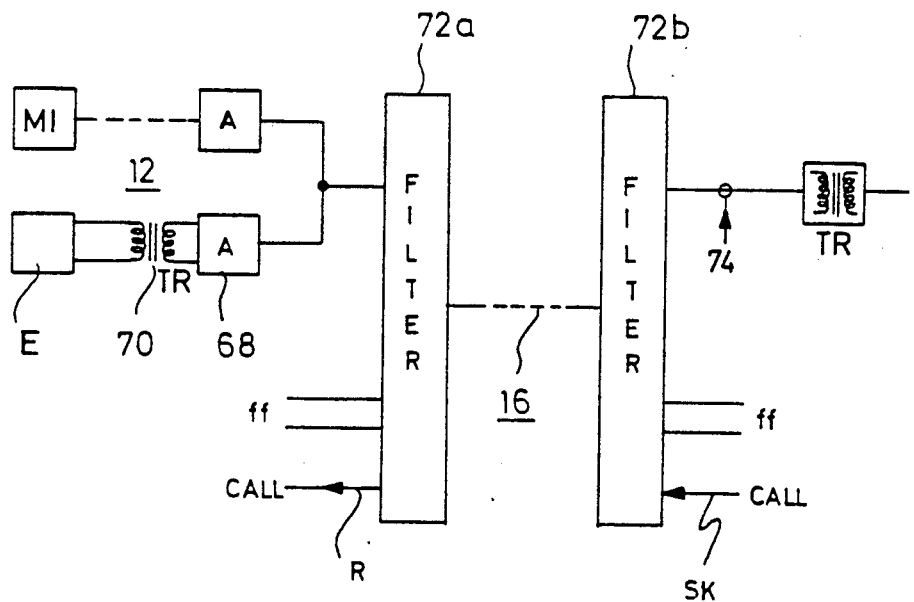
FIG. 4 is a block circuit diagram of a further long-distance transmission system according to the invention.

FIG. 4 shows the principle of a subscriber circuit according to the invention with a unit 12 (shown in simplified form) corresponding to FIG. 2, which in addition contains another amplifier 68 and a transformer 70, which are connected between the line 16 and the decoder-telephone-receiver-unit indicated by E. The line 16 is activated via filter units 72a, 72b, which limit the band of the speech signals to the requisite bandwidth, which in the method according to the invention is relatively small. One can therefore give still additional signals ff and a call-signal CALL on one side at SK via the filter circuit 72b onto the line, and on the other side at R conduct them to an alarm-bell of the pertinent subscriber-apparatus. Since the speech connection in the present case needs only a small bandwidth, still other signals ff can also be transmitted over the line 16. The feed and the loop-monitoring occurs via a connection 74. Selection can be done by multi-frequency methods or by direct-current impulses or with the code alternating current.

Figure 5:
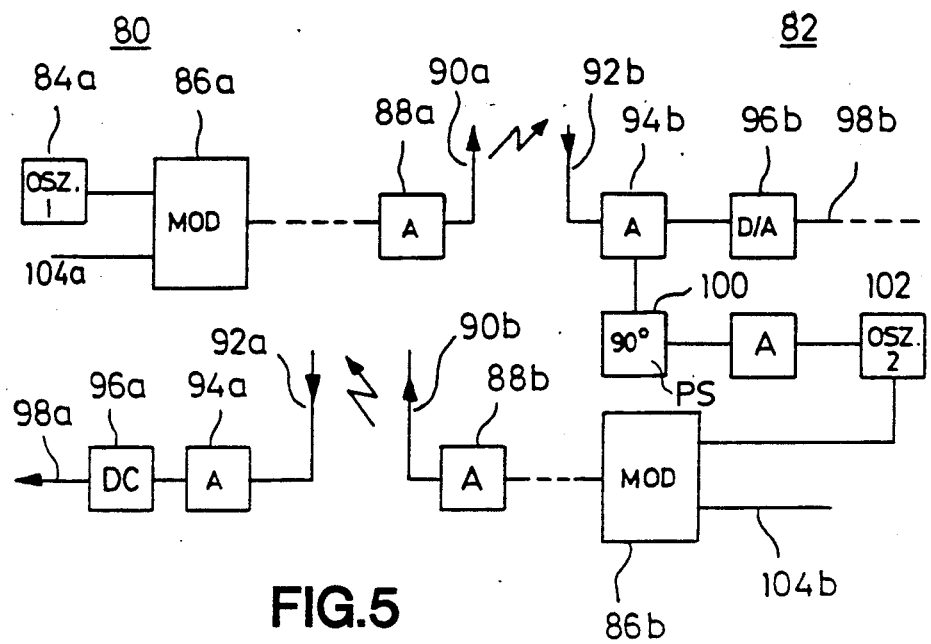
FIG. 5 is a block circuit diagram of one embodiment of a directional radio transmission system according to one embodiment of the invention.

The above-described duplex transmission method can be provided not only as an advantageous substitute for echo compensation in subscriber connections, but also in remote communication, e.g. in radio beam or microwave connections will be explained with the aid of the principle circuit diagram in FIG. 5. Here only those components are shown which are necessary to an understanding. The transmission system according to FIG. 5 contains a first station 80 and a second station 82, which are coupled with each other through a wireless radio connection. Station 80 includes a first or master oscillator 84, which feeds a digital modulator 86a, which has a code signal input 104a and will be explained in more detail with the aid of FIG. 6. The binary modulated oscillator signal, which consists of small and large periods or half-waves (as is explained in the above-mentioned U.S. patent) and has a frequency adapted to the radiation, is then conducted to an end- or transmitter (power) amplifier apparatus 88a, at whose output a transmitting antenna 90a is connected. The radiated signal is received in station 82 by means of a receiving antenna 92b and conducted via an amplifier 94b to a digital/analog converter 96b, which delivers an analog output signal to a line 98, to which a subscriber (not shown) or an electro-acoustical transducer (telephone receiver) can be connected. The output signal of the amplifier 94b is conducted further via a 90° phase shifter 100 to a synchronization input of a second oscillator 102, which delivers a base-signal for a modulator 86b, which is constructed analogously to the modulator 86a. The modulator 86b receives a code signal via an input 104b, which code signal represents for example speech and delivers, analogously to the unit 86a, a code alternating current which is conducted to a transmitting antenna 90b via a sending amplifier unit 88b.

Station 80 includes further a receiving antenna 92a, to which an amplifier 94a is connected, which supplies a decoder 96a, to which a line 98a is connected, which leads to a subscriber or to a telephone receiver or the like.

The harmonics and noise, which are present in an undesired manner in the signal to be sent can allow themselves to be compensated in that one processes the modulator output signals via a filter blocking the useful signal band, a 180° phase shifter and an amplitude adjusting member and combines it with the unaltered signal in such a manner that the harmonics and the noise are compensated.

Figure 6:
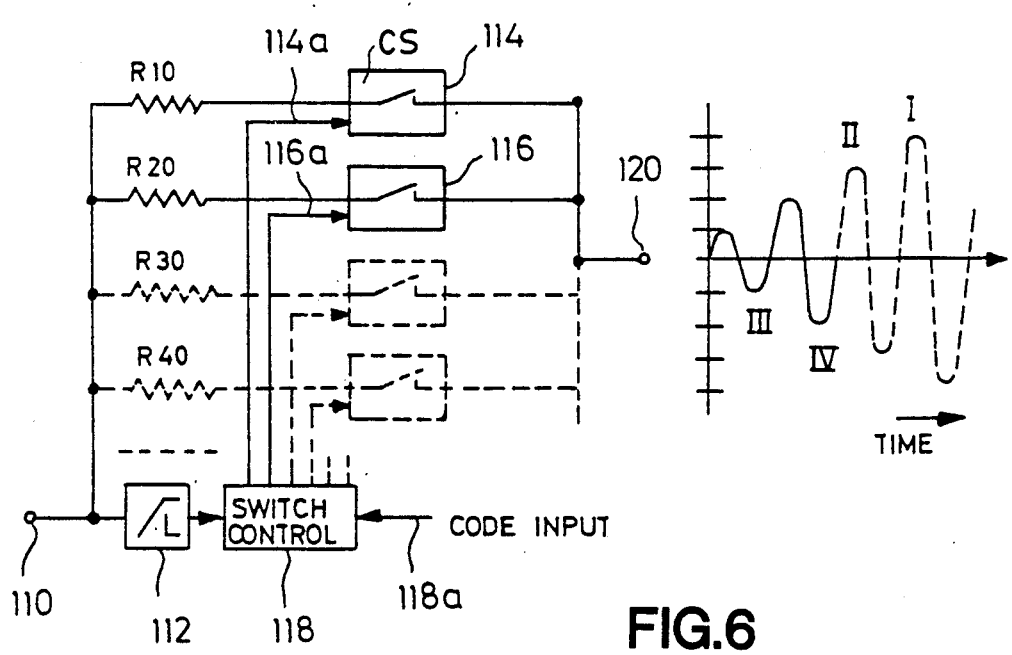
FIG. 6 is a circuit diagram partly expressed in block form of a preferred encoder.

The circuit arrangement according to FIG. 6 includes an input 110 for the oscillator signal, to which on the one hand a first connection from resistances R10, R20 etc. and on the other hand an input of a limiter circuit 112 are connected. The other end of the resistances R10, R20 is connected to a corresponding first switch-contact of controllable switches 114, 116, ... which show control inputs 114a, 116a. A synchronization input of a switch-control circuit 118 is connected to the output of the limiter 112, which switch-control circuit 118 in addition has still another code signal input 118a and two outputs connected with the switch control inputs 114a, 116a. The other connections of the switches 114, 116 are connected with each other and with an output connection 120 of the circuit, which output corresponds to the output of the circuits 86a and 86b in FIG. 5.

In operation an oscillating signal is conducted to the connection 110 from the pertinent oscillator, and the signal is limited by the limiter 112. The switch-control circuit 118 is synchronized in such a way that the switches 114, 116, ... are switched at the zero crossing of the oscillator signal. A binary signal is conducted serially to the switch input 118a, which signal consists of a sequence of binary zeroes and ones and corresponds to the desired code signal. Upon receipt of a binary signal of the value 0 the switch-control circuit 118 delivers a signal to the connection 114a, which closes the switch 114 and thereby closes the switch 114 during the duration of a period of oscillation of the oscillator signal (or, in one modification, during a half-period of the oscillator signal). Then at the output 120 appears a signal of predetermined small amplitude. On the other hand, if a binary signal of the value 1 arrives, the switch-control circuit 118 closes the switch 116, so that the resistance R20 is switched into the current path between the oscillator and the output connection 120. The resistance R20 has such a much smaller resistance than the resistance R10 that the output signal has e.g. double the amplitude as in the case of closing the switch 114. In this way a code oscillation signal is produced which, as shown in the right half of FIG. 6, is composed of sinusoidal oscillation periods of smaller and greater amplitude corresponding to a desired PCM-signal.

If the code signal is supposed to have more than two amplitudes, as can be the case in the method of modulation hereinafter described, then correspondingly more resistances and switches are provided as shown in broken lines in FIG. 6, and the values of the resistances are so graded that the desired amplitude values of the output signal are produced.

The waveforms a to d in FIG. 7 show four binary coded code alternating currents k1, k2, k3 and k4, in which each period represents a code element and in fact the binary number 1 is represented by a sine wave period with a predetermined first relatively large amplitude and the binary number 0 is represented by a sine wave period with a predetermined second relatively small sine wave amplitude. If two code alternating currents of the type shown in FIG. 7 which have the same frequency are to be transmitted together, they are added with a relative phase shift of 90°. FIG. 8 shows a corresponding vector diagram in which the code alternating current k1 is represented by a vector k1(u) and the code alternating current k2 is represented by a vector k2(v) phase shifted by 90°. The amplitude of the pertinent code alternating currents corresponding to binary number 1 is designated by u1 and v1 respectively, the amplitude corresponding to binary number 0 is designated by u0 and v0 respectively. If both the sine wave periods which are added correspond to the binary number 1 ("characteristic state 1"), there arises a sum alternating current I (k1, k2) with the phase 45°. If both sine waves have the characteristics state 0, there arises a sum alternating current IV (k1, k2) with the phase 45°. In the condition 0, 1 and 1, 0 respectively there arise sum alternating currents the vectors of which are designated by II and III. They have a phase somewhat different from 45°. In the above-described manner the code alternating currents k3 and k4 shown in FIGS. 7c and d can also be added. If one wants then to add again the two resulting sum alternating currents of k1+k2 and k3+k4, these must also be shifted in phase by 90° with respect to each other. In FIG. 10 there is shown the vector diagram for both code alternating currents k3, k4 as well as the amount and the phase of the phase which results from the addition of the various conditions. K4 must be shifted with respect to k1 in phase by 90° and k3 must be shifted in phase by 180° with respect to k1. The sum alternating currents I (k1, k2) and I (k3, k4) shown in FIGS. 8 and 10 have the phases 45° and 135° respectively; they are therefore shifted in phase by 90° with respect to each other, so that they can be added. It is clear from FIGS. 8 and 10 that the sum alternating currents do not always have an angle of 45° and 135° respectively. The phase angle depends upon the amplitude of the smallest characteristic states u0, v0. Upon continuous alteration of the vectors the frequency will also continuously change. This is also the case in doubled QAM.

In FIGS. 11 and 12 there is shown the formation of the sum alternating currents. It is clear from FIGS. 11a and 11b that if the vector alternating current k1(u) has a maximum amplitude, the vector alternating current k2(v) which is shifted by 90° with respect to this vector alternating current according to FIG. 11b is just zero. This makes it possible again to separate the alternating currents at the receiving end. The sum alternating current is always measured or sampled at the zero crossing of one of the two vector alternating currents. In this way one has then measured the amplitude of the halfwave of the one vector alternating current. From FIG. 12 it is clear that the zero crossings of the two vector alternating currents lead or lag the zero-crossing of the sum alternating current by 45°.

As mentioned, the variation in the angle of the sum alternating current depends upon the smallest value of the vector alternating currents. This is clear from FIG. 13. If the smallest value of the code- or vector alternating currents is just zero, the sum alternating current would make phase jumps up to 90°. In order to maintain no too large phase jumps during simple QAM, one can for example provide only one alternating current at the sending end to which one allocates four amplitude levels. The conditions designated in FIG. 8 with II and III are for this purpose placed in the 45° vector, as is clear from FIG. 9. One can then, as is shown in FIG. 14, provide a quaternary code with the conditions 0/0, 1/1, 1/0 and 0/1. The production of the necessary amplitude levels can be carried out for example with the circuit according to FIG. 6, which then contains four resistances and four switches. The conditions I, (II) IV (III) shown in FIG. 9 can also be coded with a half-wave, and therefore a half sine wave period, so that one has 16 possible combinations in one period. If one produces with switches according to FIG. 6 two code alternating currents which are phase shifted with respect to each other by 90°, one can then again add these to each other. In that case there results at the receiving end a two-step detection as in the case of double QAM. The four conditions shown in FIG. 9 can also be assigned to different phases. From the encoder there is then given a criterion for the generator for the alternating currents, whereby the generator is caused to be changed to another phase condition. The principle of such a circuit is shown in FIG. 15.

Figure 15:
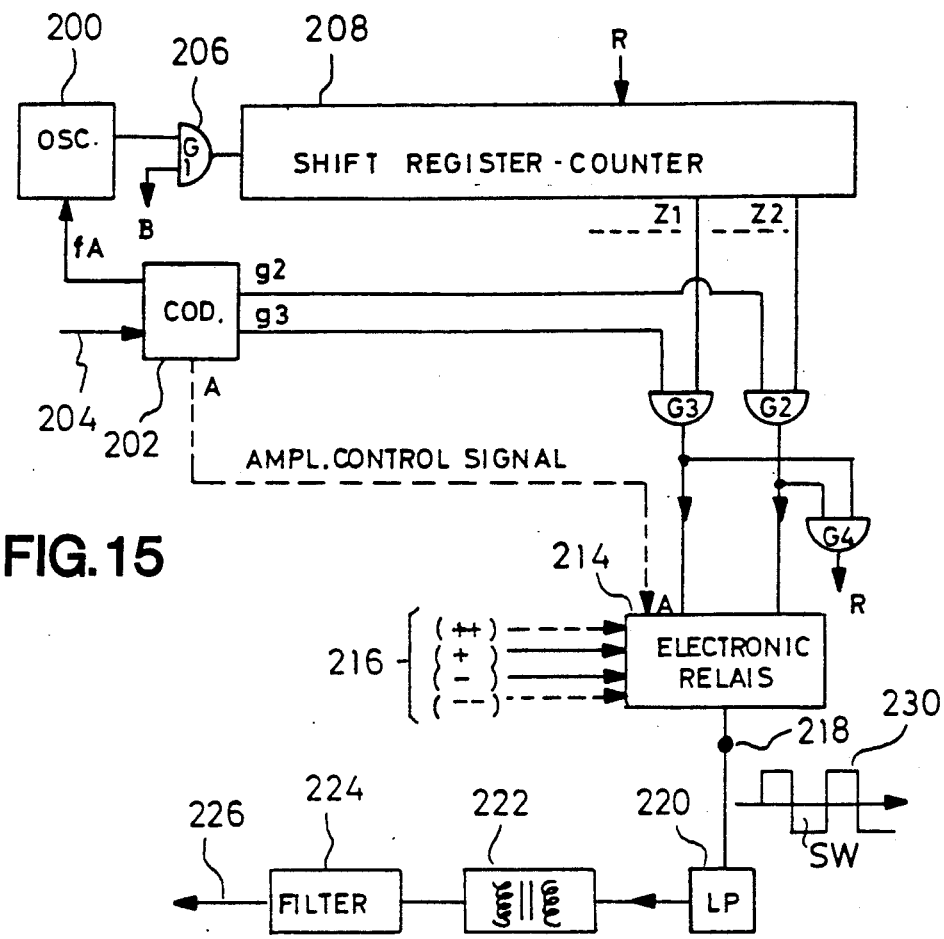
FIG. 15 is a block circuit diagram of an arrangement for the production of a phase-angle modulated code alternating current.

The circuit according to FIG. 15 includes an oscillator 200, which delivers an oscillation fA to an encoder 202, to which in addition still another information signal is delivered via an input 204. The output signal of the oscillator 200 is also conducted via an AND-gate 206 to a shift register 208 which serves as a counter. Said shift register 208 has outputs Z1, Z2. The encoder has phase-control outputs g2, g3, which are each coupled with one input of AND-gates 210, 212. The other inputs of the AND-gates are coupled with the outputs Z1 and Z2 respectively. The outputs of the AND-gates 210, 212 are connected with an electronic relay 214. A start-signal B is conducted to a second input of the AND-gate 206, which signal is produced at the start of a transmission and which is maintained during the transmission. The electronic relay 214 has moreover two inputs 216 for a positive and negative direct voltage and an output 218, at which a square-wave oscillation arrives, which is transformed by a low-pass-filter 220 into an at least approximately sinusoidal signal and then given via a transformer 222 and a filter 224 to a transmission path 226, e.g. a lead. The production of the various amplitude-conditions can result in FIG. 15 as follows: one uses a multi-pole relay, to which a corresponding number of various positive and negative voltages are conducted, or one can connect a circuit according to FIG. 6 between the relay 214 and the low-pass filter 220.

For the sake of simplicity, only two code outputs g2, g3 and only two AND-gates 210, 212 are shown. In practice, just so many of these elements will be provided as there are incremental phase changes in the lead and lag direction which are to be carried out.

When during operation the encoder 202, for example, makes the AND-gate 210 ready to open by means of the signal g3, the electronic relay 214 receives a switch-impulse as soon as the shift register operating as counter has counted up to the step which designates the output Z1. Simultaneously a reset signal R is produced via a gate 228. When the shift register 208 the next time reaches the output Z1, the electronic relay 214 again switches, so that a square wave output oscillation 230 is produced, whose period depends upon the condition of the output Z1. By lengthening or shortening the period one can obviously insert every desired phase condition, and the lengthening and shortening, respectively, of the period can simply be brought about by using the output signals of various outputs Z1, Z2, ... of the shift register 208 for the switching of the electronic relay 214, wherein the active output at any time is designated by the encoder 202.

Figure 16:
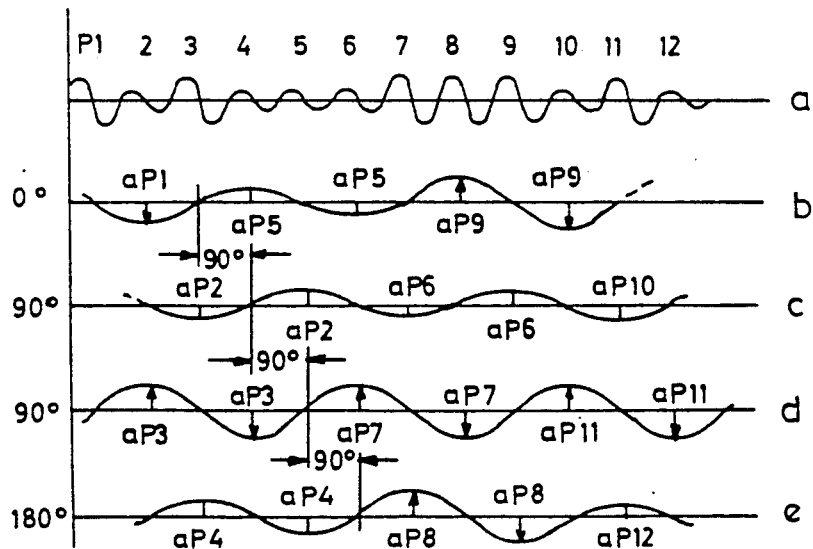
FIG. 16a–e serve to explain a method for reducing frequency.

FIG. 16 shows in curve a code of binary code elements, which consist of an alternating-current period, which is sent in an unbroken sequence of positive and negative half waves. The two characteristic states (binary value 0, binary value 1) are shown by a large and a small amplitude value, respectively. For the encoding of a speech signal 64 kHz is necessary. For transmission technical reasons it is often appropriate to use a smaller frequency for the transmission of the code alternating current. If one wants to halve the frequency, one uses two code alternating currents each of 32 kHz; for a quarter of the frequency four code alternating currents with a frequency of 16 kHz each are required. The low frequency code alternating currents are produced by samples which are taken at times which are phase-shifted with respect to each other by 180° or 90°, as is explained in the above-mentioned European patent application 110,427. The curves b, c, d, e, in FIG. 16 show the four code alternating currents of lower frequency. The binary values are taken in time multiplex processes behind the encoder.

Figure 17:
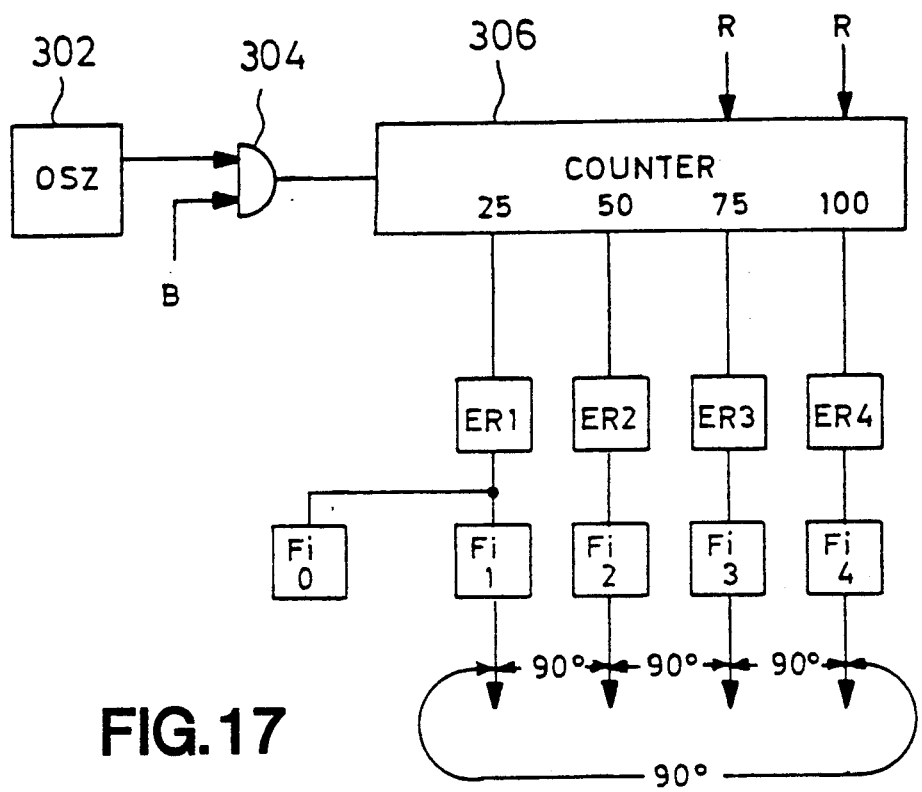
FIG. 17 is a block circuit diagram of a circuit for the production of phase-shifted oscillations.

The sample-taking carried out by time-multiplex methods, as well as the production of the code alternating currents phase-shifted by 90° with respect to each other according to FIG. 16, can be accomplished with a circuit arrangement according to FIG. 17, which is distinguished by particular simplicity. It includes an oscillator 302, whose output is coupled via an AND-gate 304 with a shift register 306 working as a counter. The shift register has outputs at which an output signal arises at the count values 25, 50, 75 and 100. The outputs are coupled with electronic relays ER1, ER2, ER3 and ER4, respectively. The outputs of the electronic relays are coupled with corresponding filter-circuits Fi1, Fi2, Fi3 and Fi4 respectively. Moreover, the start-signal B already mentioned hereinabove is conducted to the AND gate 304. Moreover, the output 100 of the shift register 306 delivers a reset signal for the shift register, so that this therefore always counts from 0 to 100. If a hundred oscillations correspond to a half period of the code alternating current, square waves arise at the outputs of the electronic relays, which at times are switched by an output signal from the corresponding output of the shift register 306, which square waves are shifted in phase by 90° with respect to each other. If one uses half waves instead of periods as code elements, the code alternating current according to FIG. 16a needs to have only one frequency of 32 kHz and the code alternating currents according to FIG. 16b to 16e have then the frequency 8 kHz.

In the methods and circuits described hitherto, alternating currents of various phases are used. The phase modulation is used with reference phase as well as with difference-phase. In the following description there will be described how such phase changes (i.e. a phase-angle modulation (phase- and/or frequency modulation)) can be realized circuit-technically.

Figure 18:
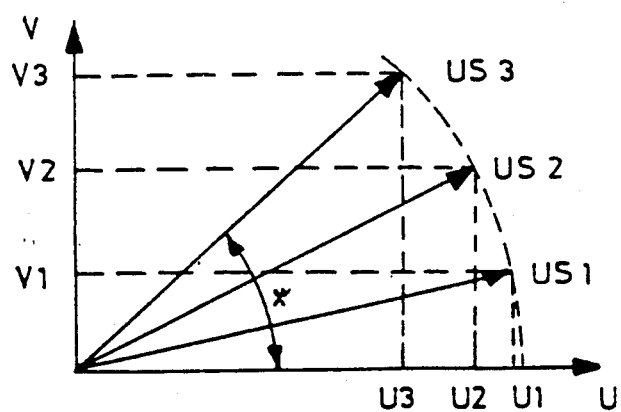
FIG. 18 is a vector diagram.

In European patent application 197,529 a method is disclosed showing how, in a phase-change (e.g. in QAM), one can avoid an additional amplitude change. This is again briefly described with the help of the vector diagram in FIG. 18. One starts by considering two alternating currents U and V phase-shifted by 90°. Let it now be supposed that a phase jump with the angle x is to be carried out in three steps without change in amplitude. The amplitudes U, US1, US2 and US3 should then be equal in magnitude. The vectors U and V must then be simultaneously changed, in order to accomplish this, and indeed in the combinations U1/V1, U2/V2 and U3/V3. Since a phase change does not produce any additional amplitude change, one can also use still another amplitude change for encoding. In the following material it will be described how such phase and amplitude changes can be carried out quite simply and exactly.

FIGS. 19a, b, and c shown quite schematically a transmission system which includes a sending station 300, which is connected with a receiving station 304 via a transmission path 302. In the transmission path a low-pass filter 306a, 306b or 306c respectively is connected. If the low-pass filter 306c, as shown in FIG. 19c, has a limiting frequency of 5.5 MHz, the receiving station 304 receives a still more emphatically square wave form oscillation 308c. If the limiting frequency is 3.5 MHz, as in the case of the filter 306b in FIG. 19b, then there is received at the receiving station a quasi-square wave oscillation 308b with markedly rounded corners. In the case of the low-pass filter 306a of FIG. 19a, which has a limiting frequency of 1.5 MHz, there is received at the receiving station 304 a wave form most similar to the sinusoidal 308. The period does not change during the low-pass filtering. Therefore, one can, by changing the period of the square-wave oscillations, produce a sinusoidal alternating current with correspondingly changed period or frequency with small harmonic content.

Figure 22:
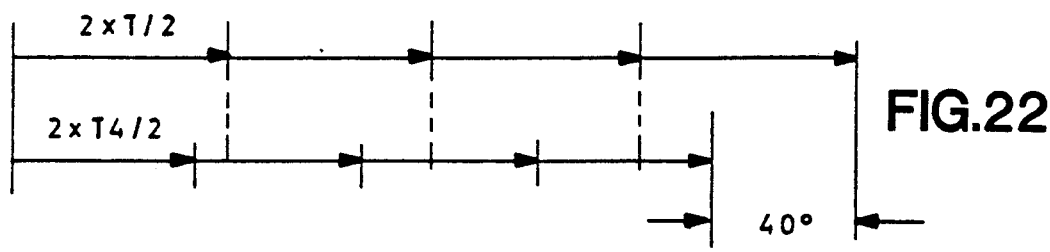
FIGs. 22 and 23 serve to explain a method of phase shifting.

FIG. 20 shows square wave impulses with various periods T=f, T=f1 and T=f2. By means of low-pass filtering according to FIG. 19a one can achieve a sinusoidal alternating current with the same period. Since an increase of or decrease of frequency is introduced by phase change, a frequency change corresponds to a phase jump. In FIG. 21 oscillation forms are shown which arise in the case of a phase-sampling of the customary type. One sees that with each phase change a frequency change results, but not in a continuous manner. Therefore it is also difficult at the receiving end to ascertain the size of a phase jump from the period duration. In order to keep frequency changes and thereby the frequency band small, one can split each phase jump into steps, as is shown schematically in FIG. 22. In this Figure the half period of a pulse corresponding to 180° is designated with T/2. One can divide this angle into thirty-six steps each of 5 degrees. If a phase jump of 40° is carried out, each half period is shortened four times by 5°, so that a retard of 40° results. The half period duration with respect to the reference impulse is then T1/2. After the phase jump one can either keep the resulting frequency, or again switch to the frequency corresponding to T/2, while one provides a phase jump of 5° in the opposite direction. With respect to the reference phase, there is then still a phase shift of 30° present.

Figure 23:
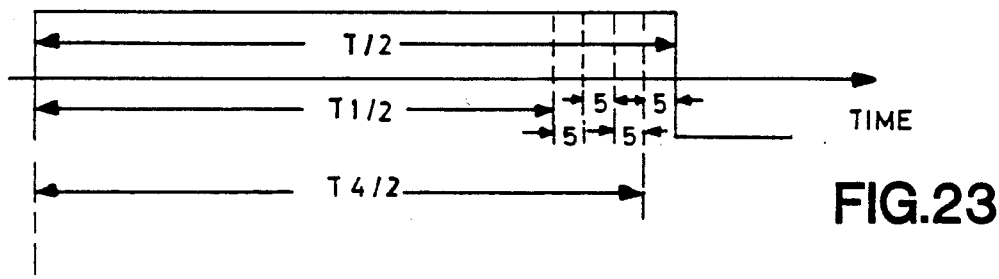

In FIG. 23 there is drawn in time four times the periods of the reference phase and four times the periods shortened by twice 5°. By comparing after the fourth period, the difference of 40° with respect to the reference phase is apparent.

The circuit arrangement according to FIG. 15 can be used for carrying out such phase changes. Let it be assumed that the period duration of 360° is divided into seventy-two steps of 5° each. Each step should correspond to ten clock pulses, so that seven hundred twenty clock pulses fall in the period and 360 clock pulses fall in the half period, which clock pulses are produced by the oscillator 200. At the sending end only the half periods need to be coded, in principle. The second half period is then driven via the encoder 202 at times. If phase-jump steps of 5° are provided, then in case of an advance change three hundred fifty clock pulses are required for the half period, and three hundred seventy in the case of a retard phase change. The shift register 208 which serves as the counting unit must therefore have at least three hundred seventy outputs for this use. The clock pulse frequency depends therefore upon the encoding frequency. By changing the oscillator frequency one can change the duration of the pulse. Assuming that the output Z2 of the shift register 208 corresponds to three hundred seventy measure- or clock pulses, i.e. a retard phase shift, then if such a phase shift is desired, a priming-potential is placed from the encoder 202 via G2 to the one input of the gate G2, so that this gate delivers an output-pulse, if the shift register 208 has been re-switched to output Z2. The electronic relay 214 places then a positive potential (+) on the output 218. Via a connection A the encoder 202 is connected with the electronic relay 214. At the next cycle of the shift register to Z2, the electronic relay 214 is driven via the connection A in such a manner that minus potential is placed on the output 218. The electronic relay 214 can nevertheless also be a flipflop, which at the introduction of an input pulse from gate G2 etc. changes the state and thereby the potential of the output voltage. At the output 218 there arises corresponding bipolar square wave pulses 230, as has already been explained. One could equally well produce unipolar square wave pulses. The above-described provisions repeat as long as the encoder 202 applies a priming potential on the gate G2. If e.g. five phase steps are provided for a phase jump, one lets the shift register 208 cycle ten times to Z2. The output signal from Z2 sets the shift register 208 back via the gate 228. Thus it is possible, by a various large number of outputs of the shift register 208 and/or by changing the oscillator frequency to determine (or set) the pulse duration, the number of phase steps, and the size of the phase steps. The drive can be accomplished via the encoder 202. The change of oscillator frequency can be driven by the encoder 202 via a connection fA.

With the above-described circuit the following encodings are therefore possible: advance phase shift, retard phase shift, constant phase. Phase changes can be carried out step-wise. The phase difference or the reference phase can be used. In addition, an amplitude encoding can be provided, in certain cases also step-wise. An additional possibility consists in the provision of encoding with positive or negative pulses or half waves. Also the number of square-wave pulses is a further code means. One can also pick out a harmonic of the square wave pulse. If this is done e.g. with the third harmonic, then three periods are contained in one (+/−)-pulse. In these three periods then phase shifts are also contained, if the pulse duration is changed.

The circuit arrangement already described according to FIG. 17 can equally be used for the production of phase-shifted alternating currents of equal frequency. The filter Fi0 can e.g. be a band-pass filter adjusted for the third harmonic of the square-wave pulse, so that one obtains at the output of this filter an oscillation of the three-fold frequency of the square-wave pulse with corresponding phase or phase change.

The detection of phase shifts is accomplished advantageously by measurement of the period duration. It is known that in the case of quadrature modulation the zero crossing of the component- or vector-alternating currents leads or lags the zero-crossing of the sum alternating current by 45°. If e.g. the half period of the sum alternating current is measured from zero-crossing to zero-crossing with a circuit arrangement analogous to that according to FIG. 15, one can fix the time points which lie 45° before and 45° after the zero crossing and there take samples which indicate the amplitude values of the component- or vector-alternating currents.

Figure 24:
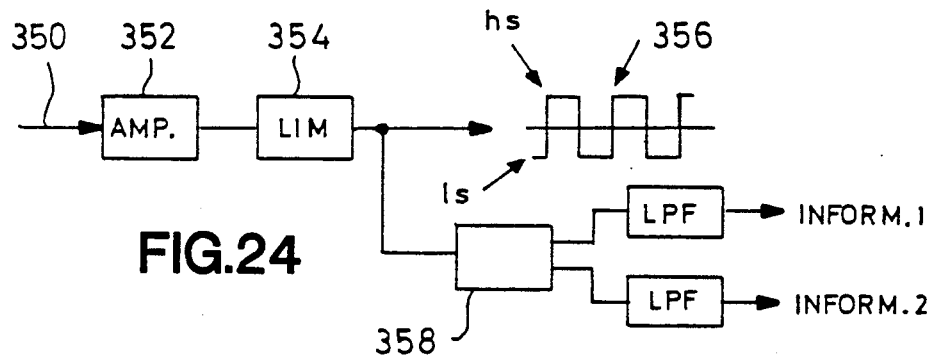
FIG. 24 shows a circuit for assimilating information.
Figure 25A:
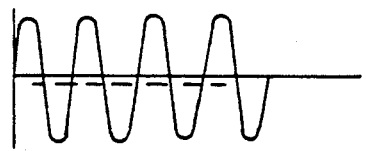
FIGS. 25a, b as well as FIG. 26 show wave forms for the explanation of a method according to the invention.
Figure 25B:
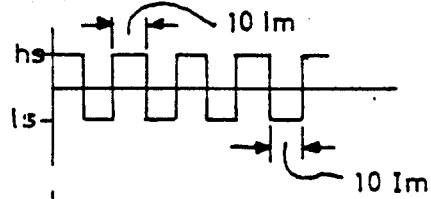
Figure 26:
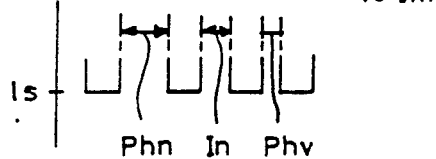

In the following description the valuation of phase steps will be described with reference to FIG. 24. A code alternating current arriving from a transmission path 350 is transmitted via an amplifier 352 and a limiter 354. In the limiter the period of the alternating current is converted into a square-wave oscillation, which acts as synchronizing impulse 356 with the peak amplitudes hs and ls, as shown in FIG. 25. The curve a in FIG. 25 shows the received code alternating current and the curve b the synchronization pulse after the limiter. The detection is accomplished with clock or measurement-impulses, these have such a high frequency that ten of such measurement-impulses fall in a half named-period of the synchronization oscillation, as is shown in FIG. 25b by "10 Jm". In FIG. 26 the negative, limited half waves of the code alternating current are shown. If a retard phase shift occurs, the half periods are longer and the distance between two negative half waves amounts then to Phn. In the case of advance phase shifting, the period duration is shortened, and the spacing of the negative half waves is then Phv. The named spacing is designated by In. At the output of the limiter, a detection circuit 358 and a low-pass filter are moreover connected, which will be explained in more detail with reference to FIG. 28.

Figure 27:
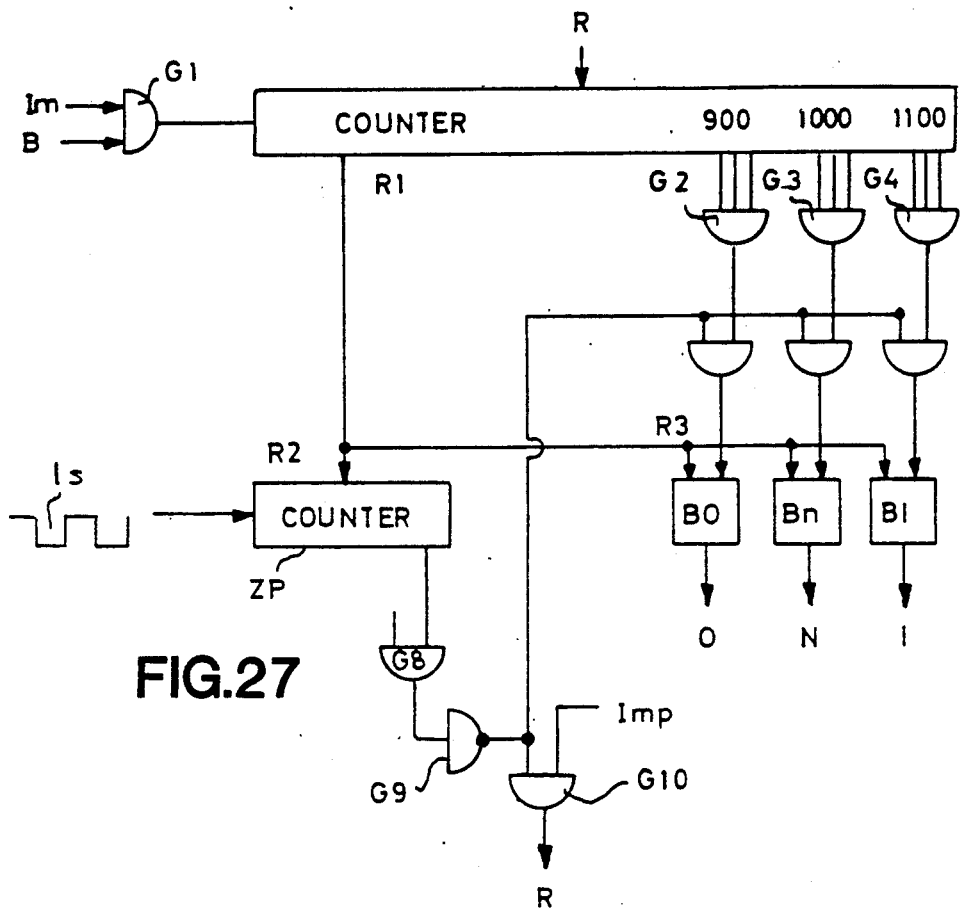
FIG. 27 shows a detection circuit.

In FIG. 27 a detection arrangement is shown, in which with the aid of measurement pulses Jm, which e.g. stem from a quartz oscillator not shown, the sum of the phase shifts by ten phase shift steps, which are encoded by a period, is measured. For the numbering of the measurement pulses there is a counting member Z and for the numbering of the phase-shift-steps or periods, respectively, there is provided a counting member ZP to the input of which is conducted the negative half waves ls according to FIG. 26. There are three different large phase shift steps provided, of which the sum of ten steps define a characteristic state. The characteristic states 0, N and 1 are characterized by ten phase steps or periods, respectively, with each 90 or 100 or 110 measurement pulses. The measurement pulses Jm are conducted to the counter member Z via a gate G1, at which moreover the selected start signal B lies. After ten phase steps the counter member has counted to 900 or 1000 or 1100, according to whether it is a question of ten shortened periods, ten normal periods, or ten lengthened periods corresponding to a retard, unchanged or advance phase. In order to introduce a certain tolerance there is also connected together via an OR-member G2, G3, G4 for each count member output before and after 900, before and after 1000 and before and after 1100. The tolerance can naturally also be chosen greater. The pulses ls drive the count member ZP. After ten periods without phase shift the count member Z has counted to the output 1000, while the count member ZP has become reset to output 10 by the pulse ls. With the beginning of the eleventh period it must therefore be tested whether the characteristic state 0, N or 1 is present. The detection of the characteristic state N and the resetting of the counters occurs in the following manner: upon reaching the output 100, an output signal is present at the output of the gate G3 which is conducted to a gate G6. The output corresponding to the count 10 of the counter ZP is connected with one input of an AND gate G8, whose other input receives the pulses Jn or Hs, respectively. With the beginning of the eleventh pulse Hs there lies at the inputs of G8 two potentials h and at the output of G8 the potential 1. This potential is inverted by an inverter G9 and the thereby arising potential h is conducted from the output of G9 to a priming input of G6. The gate G6 thus is opened and the output signal which arises switches a bi-stable flip flop Bn into the operational condition so that Bn produces an output signal N which reveals this characteristic state. The reset of the counter Z results via and AND gate G10. With the eleventh pulse Jn or hs there occurs a switching of the output signal of G8 and G9. Via Imp a potential h is laid also at the second input of G10, i.e. in the measurement-pulse pause, so that at the output of G10 a reset sigal R arises which is conducted to the counter Z for resetting. The resetting of the bi-stable member Bn and the corresponding bi-stable members B0 and B1 occur due to a signal from the output R1 of the counter Z. R1 can e.g. be the output of the second or third step of the counter Z. If this output is reached, then the counter ZP is reset by the potential change connected therewith via a reset input R2, and the bi-stable circuits B0, Bn, B1 are reset via R3. The detection of the characteristic states 0 and 1 occurs in corresponding manner with the signals via the gates G2, G5 and the bi-stable member B0 or the gates G4, G7 and the bi-stable member B1, respectively.

Figure 28:
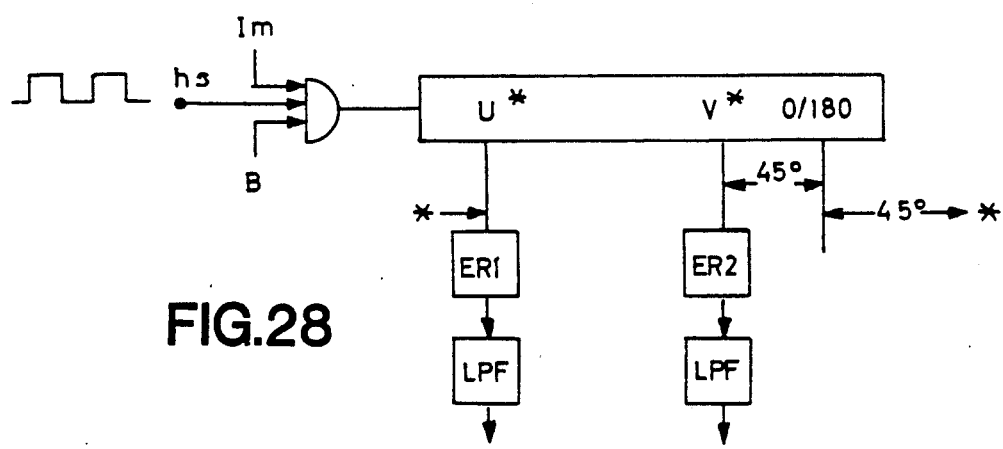
FIG. 28 shows a circuit for the production of phase-shifted oscillations.

FIG. 28 shows a circuit arrangement for ascertaining the points in time at which the samples (which show the component- or code-alternating current) can be taken from a quadrature- or QAM-sum-alternating current. Let it be assumed that the sum alternating current is operated on by a limiter and, corresponding thereto, has the form, shown in FIG. 25b, of a square-wave oscillation with positive half waves hs and negative half waves ls. The circuit according to FIG. 28 contains an AND-gate G, to which the positive half waves hs, measurement pulses Im and the aforementioned start-signal B are conducted. The frequency of the measurement pulses Im is chosen to be such that the counter Z is reset to an output 0/180 by the measurement pulse during a pulse hs. Since at the zero crossing of one of two code- or vector alternating currents UV (FIG. 29) (phase-shifted with respect to each other by 90°) the other always has its greatest value UA or VA, respectively, one can at these places obtain the amplitudes of the component-alternating currents from the sum alternating current. The counter Z has corresponding thereto outputs U* and V*, which lie at corresponding phase angles of the periods defined by the signals hs. The output signals arriving at the outputs U* and V* are conducted to electronic relays ER1 or ER2, respectively, which operate as sample-circuits. The circuit arrangement according to FIG. 28 is shown in FIG. 24 by the block 358. The signals from the electronic relays can be led then through low-pass filter LPF, at the outputs of which the component- or code-alternating currents are available.

Figure 29:
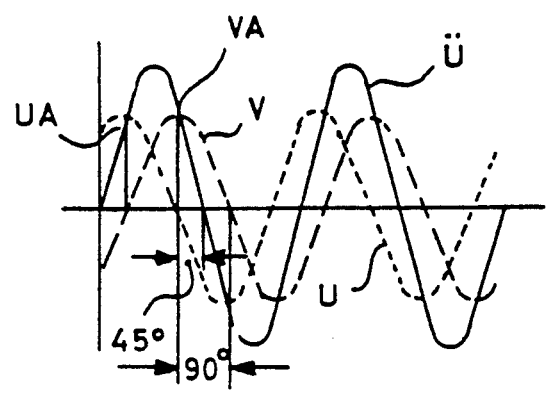
FIG. 29 shows the principle of the detection of a summed oscillation.

FIG. 8 can also be regarded as a vector diagram for a quaternary encoding of the positive half waves of a code alternating current. One can again provide a corresponding encoding with the negative half waves of the periods, so that with one period $2^4$ possibilities for encoding are available. If still another alternating current is modulated in the same manner, phase-shifted by 90°, added to the first-named encoded alternating current and transmitted as a sum code alternating current, one can within one period represent $2^8$ code combinations with relatively small band width. With additional phase-encoding one can obtain further combinations. In FIG. 30 three periods with different phase states are shown. Each phase jump means also a frequency change, as has already been mentioned in the description of FIG. 15. The period with the frequency f is the normal phase. f1 has a frequency of 1.1 MHz, so that a phase advance of 36° results. f2 has a frequency of 0.9 MHz, so that a phase delay of 36° results. As appears from FIG. 8, the sum alternating current I (k1, k2) is advanced or delayed by 45°, respectively with respect to the vectors alternating currents k1(u) and k2(v). As FIG. 29 shows, the sum alternating current has the amplitude values UA and VA, if one of the component alternating currents has the value 0. This is used in the valuation in the receiving end. Circuits for this are known. One other possibility would be explained with the aid of FIG. 28. The arriving sum alternating current is led to a limiter, as in FIG. 6, so that square waves arise with positive half waves hs and negative half waves ls. From these pulses one can ascertain the period duration and the phase state. Since it is known that the component alternating currents are phase-shifted by 45° advanced or delayed with respect to the sum alternating current, one can take samples at the pertinent points. The outputs of the stages U* and V* correspond to the desired phase-shifts of 45°. In the case of encoding according to FIG. 14, there are four possible combinations. One can provide only one detection also by connecting together the four combination alternating currents in four current circuits, i.e. with 180° phase shift of each combination. In FIG. 31 the combination 1/1 is shown. The sum alternating current I(k1, k2) is composed of the two vector alternating currents k1(u) and k2(v). In the detection of these combinations the two vector alternating currents, phase-shifted by 180°, are connected with the sum alternating current I(k1, k2). The 180°-phase-shifted vector alternating currents are shown in FIG. 32. FIG. 33 shows an example in which the vector alternating current k1(u) has the greatest amplitude, while the vector alternating current k2(v)

has only half the amplitude of k1(u). In FIG. 34 the two vector alternating currents are now phase-shifted by 180°. If the sum alternating current of FIG. 33 contains this combination, the alternating currents will cancel each other.

Figures 35, 41:
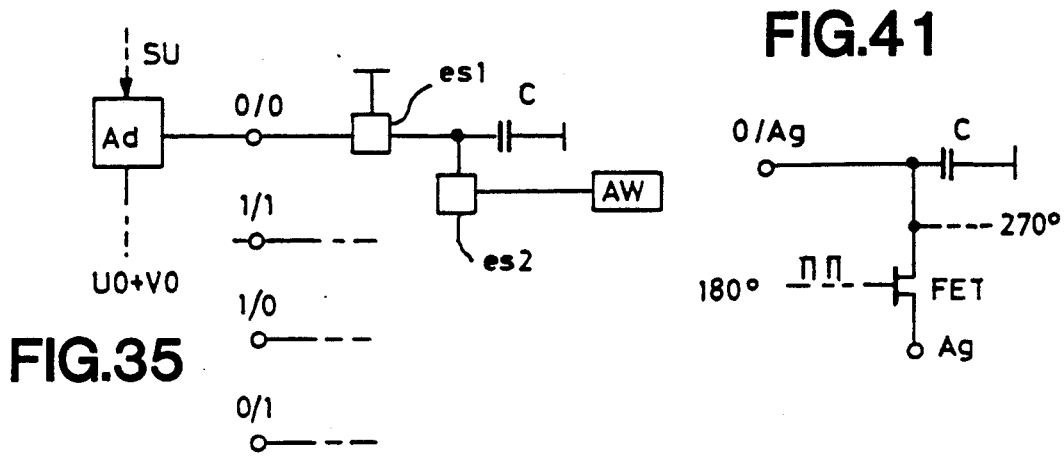
FIG. 35 shows a detection circuit according to the invention for summed code alternating currents.
FIG. 41 shows a circuit for phase shifting.

In FIG. 35 there is shown, highly schematically, a detector circuit with reference to the above for the combinations 0/0; 1/1; 1/0; and 0/1. The circuit arrangement according to FIG. 35 includes for the combination 0/0 an adder Ad with two inputs. To one input is led the sum alternating current SU of the transmission value and to the other output is led the alternating current uO+vO (FIG. 8). Thus to the input designated with uO+vO there is always led an alternating current (IV in FIG. 6) of the same amplitude. To the adder for the combination 1/1 (not shown) is led the sum alternating current SU and moreover continuously the combination alternating current I (FIG. 6). To the adder for the combination 1/0 is led the sum alternating current and moreover the combination alternating current II according to FIG. 6, and to the adder 0/1 the sum alternating current and the combination alternating current III. The combination alternating currents are phase-shifted by 180° with respect to the corresponding code alternating currents. If, therefore, the coded oscillation in the sum alternating current corresponds with the compensation alternating current, these two alternating currents will cancel each other if they have the same amplitude adjustment (which is set ahead of time). At the output of the adder Ad there is connected a sample-and-hold circuit with a switch es1 and a condenser C. After each period the output signal of the adder is momentarily sampled by the switch and stored in the condenser C.

Afterwards the condenser is connected with a detection circuit AW via a second switch es2. The detection circuit AW can operate for example as a threshold-value circuit. The detection circuit AW need only confirm whether or not there is a potential on the condenser C. If there is no potential on the condenser C, this shows that the combination 0/0 has been recognized. After the detection the condenser C is discharged via the switch es, which for this purpose can have a further switch setting.

Since in FIG. 30 the various half period durations are not known before the detection, as a practical matter one would go through all possible samplings and after the measurement of the half period duration only utilize those which have the then current half-period duration.

Figure 37:
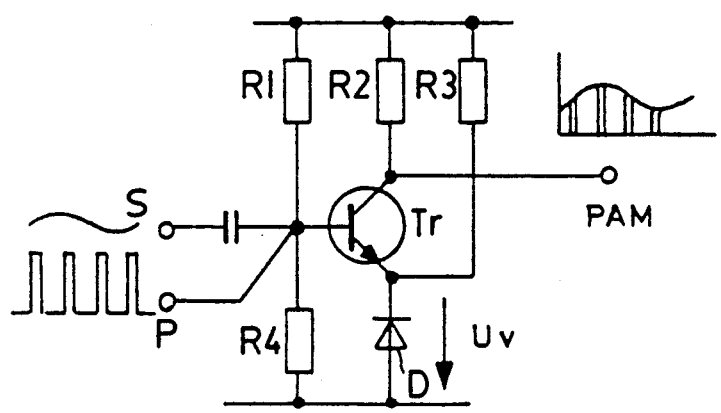
FIG. 37 shows a circuit for pulse amplitude modulation.

In the circuit arrangement according to FIG. 35a, four speech channels K1, K2, K3, K4 are sampled in bipolar time-multiplex fashion, and united according to the principle shown in FIG. 36 into one code alternating current. The code alternating current has then a frequency of 4×8=32 kHz. The circuit arrangement according to FIG. 35a contains a multiplexer Mu, to the inputs of which are led the signals from the four speech canals. Via an adder AD, a further corresponding code alternating current with a frequency of 32 kHz with a phase-shift of 90° is added. The same occurs again in a manner not shown with two additional code alternating currents, which show phases of 90° and 180° as in FIGS. 16d and e. The two sum code alternating currents can now again be added and are transmitted with a single code alternating current of the same frequency in a manner analogous to FIG. 7. A unipolar sampling of the channels corresponding to FIG. 36a is preferred, because then the smallest value to be transmitted can be made larger than the noise level. In FIG. 37 there is shown a known circuit arrangement for the production of unipolar PAM-signals. The signal is applied to a connection S and the sampling pulse is applied to a connection P. Then at the output PAM unipolar signal samples are available.

In FIG. 19 the vectors are drawn in dotted lines whose magnitude in many cases must be considered during detection. If a detection occurs according to the principle of FIGS. 31 to 34 and if it is sent according to the principle of the circuit according to FIG. 6, an arrangement according to FIG. 6 must naturally also be provided at the receiving end.

Figures 38, 45:
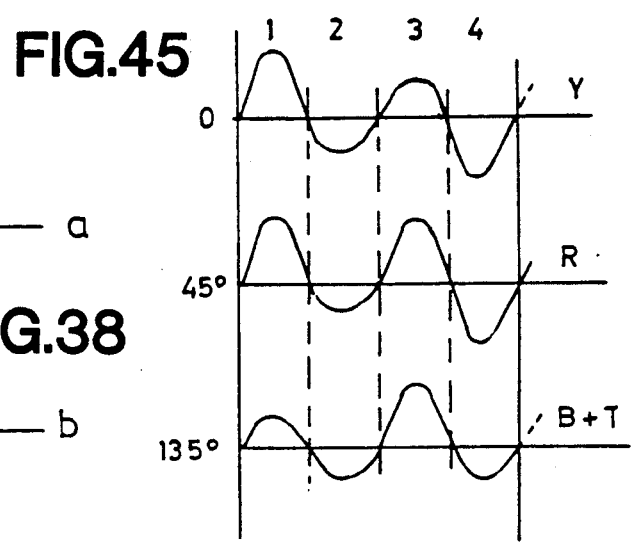
FIG. 38 shows two-bit code signals.
FIG. 45 shows coded Y-, R-, and B-signals according to the invention.
Figure 39:
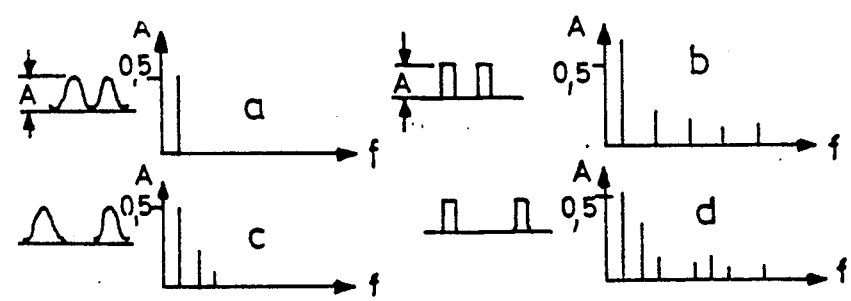
FIG. 39a through d show various signal forms and their frequency spectra.

Besides transmission of data, the above described method of transmission according to the invention also lends itself advantageously to the analog and digital transmission of speech and to the transmission of TV signals (i.e. luminance, chrominance, tone and control signals). If the characteristic states shown in FIG. 8 are arranged only with a phase state of 45°, one can encode simply at the sending end, as appears from FIG. 6. In a half wave one can then accommodate 2 bits and in the negative half wave also 2 bits, as shown in FIG. 38a. If the same is done with a second code-alternating current, which must still be phase shifted by 90°, and if these two code alternating currents are added, one can transmit 8 bits in one period of the sum alternating current. With 8 kHz it is then possible to transmit speech pulse-code-modulated. If in the case of a TV signal the luminance signal is encoded with 8 bits equally as the test sample, then one period of a sum alternating current is likewise sufficient for each test or sample: i.e., one can transmit also the PCM-signal with the same frequency as the analog signal. In today's transmission of the picture signal BE there is available a synchronization with the camera sampling. If one carries out the PAM sampling according to pixels, then for 833 pixels per line about 13 million pixels per second are required. In the case of digital transmission one then needs a frequency of 13 MHz. For these 833 pixels 52 microseconds are required, as appears also from FIG. 38c. If one encodes the sample signal with the same sampling frequency, 1025 samples would be required for each line: i.e., 16 MHz would be required for the PCM-transmission. The carrier can then be so chosen that the upper or lower side band falls in the previously assigned space in the present channel. It naturally depends upon the prices of the analog/digital converter whether one stays with the 16 MHz as code-alternating current or whether one provides a division into 2×8 or 4×4 or 8×2 MHz and whether one picks up the PAM signal in time-multiplex fashion and then converts to PCM-signals or one divides the PCM-signal in time multiplex fashion on 2, 4 or 8 channels. This is purely a question of economics. In order that the code alternating currents of the same frequency do not simultaneously disrupt each other, one can modulate them onto a carrier and filter out the carrier and one side frequency. In the case of 4×4 MHz one can e.g. provide the carriers 16, 17, 18 and 19 MHz. Two examples for the diminution of the band width of digital and analog signals, in which the half waves are used as code elements, are apparent from FIGS. 16 and 36. In addition one can still encode the color-, tone and control signals, to the extent that they cannot be brought into the blanking interval, with one or two 4-MHz channels, and bring them onto one carrier with 20 and 21 MHz. That an encoding with the amplitudes of the half waves of a sinusoidal alternating current becomes narrow-banded, appears from FIG. 39. In this Figure the amplitude spectra of cosine pulses and square-wave pulses are shown for various sample-relationships. It is apparent from FIG. 39a that if the cosine pulse is sent in a continuous sequence, there arise no harmonics. FIG. 39b shows the relationships for square-wave pulses with period duration equal to that of FIG. 39a, here of course harmonics arise. Corresponding considerations apply to the relationships which are shown in FIG. 39c and 39d. Only if an unbroken sequence of cosine-form pulses is sent do no harmonics arise. If one wants to have freedom from direct current in transmission over lines, one must provide the periods as code elements.

In the following material a few examples for use of the invention will be described, starting with analog encoding.

FIG. 40 shows the signals from two separated stereo channels which if desired can be combined by time-multiplex in accordance with FIG. 35. The stereo signals are pulse-amplitude-modulated, e.g. with the aid of the circuit according to FIG. 37, and the pulses of one of the two stereo channels is reversed in polarity. The pulses are then transformed into staircase signals, e.g. condenser-storage with fixed time constant, and then led to a simple low-pass filter with sloping edges. There arises then an essentially sinusoidal alternating current. In the example, the samples of the B-stereo signals are then the positive half waves and the those of the A-signal the negative half waves. In order to be able to transmit as many as possible over one channel, the principle of FIG. 16 is used. The sampling frequency has in FIG. 40 a phase state corresponding to the phase state 0 in FIG. 15b. Further systems according to FIG. 38 are sampled with the same sampling frequency but phase-shifted by 90°, and two further systems with a phase state of 90° and 180°, as shown in FIG. 16. Two code alternating currents phase-shifted by 90° with respect to each other are then added. The two sum alternating currents have then a phase state of 45° and 135°, and they are therefore shifted by 90° in phase with respect to each other. These two sum alternating currents can then be added again, so that with one code alternating current a system according to FIG. 40 can be transmitted four times. Often the frequency of the code alternating current (e.g. that which is necessary for the system according to FIG. 40) can be too high. In that case one can proceed according to FIG. 16. If the pickup frequency in FIG. 40 is e.g. 40 kHz, then one can divide the information in code alternating currents each with 10 kHz. The sampling must then occur at 0°, 90°, 180° and 270°. The sampling pulse trains have therefore such phase shifts with respect to each other that they cannot be added twice. One must, for this purpose, carry out an intermediate storage. One needs the following phase-shifts: 90°, 180°, 180° and 270°. The samples taken at 0° must then be phase shifted by 90°, and those taken at 90° must be equally shifted by 90° to 180°. One can also shift in phase the samples taken at 0° by 180°. There are then available 90°, 180° and 270°, and phase shifted 0° after 180°. In FIG. 41 a principle circuit diagram is shown. The samples picked up at 0° are led via a connection 0/Ag to a condenser C and stored. With the 180° sampling-pulses a field-effect transistor FET is driven, which restores the charge on the condenser C of the last probe-taking quickly via Ag. A further switch, not shown, brings the condenser to 0 potential through the 270°-sampling-pulse. Now one can always add two code alternating currents which are phase shifted by 90° and then again add the two addition alternating currents, which are phase shifted equally by 90° with respect to each other. As already mentioned in the description of FIG. 36a, one places the smallest amplitude value P6 in such a way that the pertinent half wave lies over the noise level, e.g. in FIG. 40, the amplitude values P0, P10, P14.

With the aid of FIG. 42 the pulse amplitude modulation of a video signal Y will be described. FIG. 43 shows how the video signal Y and the chrominance signals are obtained. A camera with three video tubes R, G and B delivers a red-, a green- and blue-signal. Via a Y-matrix Y-M and a transistor T the Y-signal and a -Y-signal are obtained. For the production of color-difference signals R-Y and B-Y stages Su1, Su2 are provided, to which the corresponding signals are led. In FIG. 42a the video- and sample-signals are shown. FIG. 42b shows the present method of transmission with the aid of a carrier; the disadvantages of such a transmission and the required valuation are known. In FIG. 44 the signals during the sampling time are shown more exactly. Above all things the burst B is necessary in the NTSC- and PAL-systems, since the color hue signals are coded by the phase and the burst delivers the reference phase. A burst is not necessary in the encoding method according to the invention. As already mentioned, if one uses the sample frequency of the camera also as sampling frequency for the PAM-signals, which are necessary with half wave coding 8 MHz and with period-coding 16 MHz, the sampling time signals are included. The signals produced by the clock for the camera can then equally be used also as sampling signal in the PAM. 6 MHz or even 5 MHz would surely already be sufficient as the sampling frequency. In FIG. 42c a half wave encoding is shown. One can with such an encoder proceed similarly as in the description with reference to FIG. 40. Also the sampling signals are coded by the size of the amplitudes of the half waves in the example shown. In this region one can additionally accommodate control signals. The color-, tone and control signals are digitally coded. In the case of the color values, the sum vector in the color circle is not marked by the vectors u and v, but rather each of itself according to color characteristic value, i.e., e.g., the color separation, the color difference signal, the color saturation. Whether these values belong to red, blue, and in certain cases to green, appears out of the location of the code. In the case of an example shown in FIG. 45 the phase state of the code for red is shifted 45° and that of the code for blue is shifted 135° with respect to the phase of the code alternating current for the luminance signal Y, which is 0° in value. If it is desired, one can also code red and blue serially, so that the color is coded by the serial position in the code. The coding of the color values results from the amplitudes according to the half waves of an alternating current, in the case of binary coding the conditions would be larger or smaller amplitude value (FIG. 7). In the present example, an encoding with a sum alternating current of 45° should result according to the principle of FIG. 8. With the vector of the sum alternating current one can code two, three or four or still more values. In the example of FIG. 45 the values I, (II), (III) and IV (FIG. 8) are chosen. With a half wave one can therefore code two bits, as was explained with the aid of FIG. 14. In the present example, a red-sample and a blue-sample are provided for every four luminance samples. In the time of the sample-taking of the four Y-samples, 8 bits can be used for red in the 45° alternating current and 6 bits for blue as well as 2 bits for tone- and control signals in the 135°-code alternating current. Since the utilization of the code of red and blue can result only after the four half waves, but the color value nevertheless belongs to the four luminance samples Y, the four luminance samples must be stored long enough, which occurs most advantageously at the sending end. The two alternating currents with the phases 45° and 135° have a simulataneous phase shift of 90°, so that they can be added without interference. The addition alternating current can then again be added with the code alternating current Y=0°, so that all signals can be transmitted with one alternating current. Naturally one can transmit the color values with an alternating current of another frequency, in case it is more economical. A frequency reduction, e.g. of the luminance signal Y, can be provided according to FIG. 36, if it is useful. The same is true for the color signals. An analog-digital converter is all the more economical the smaller the frequency is.

Figure 46:
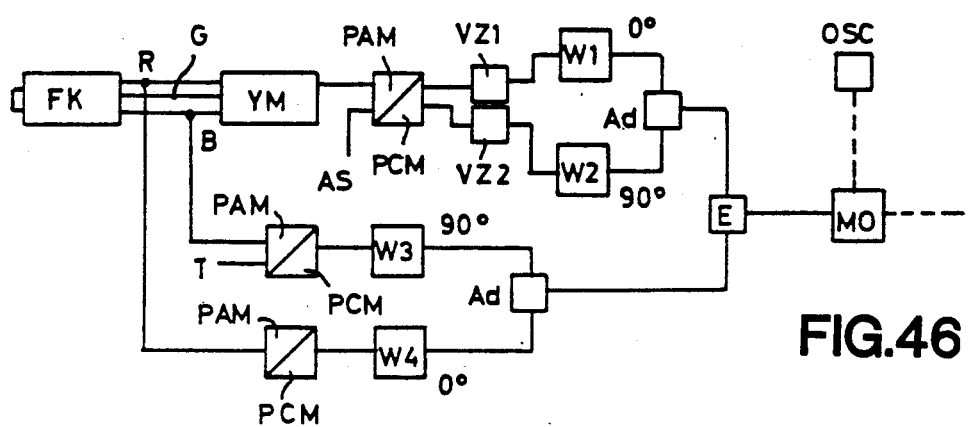
FIG. 46 shows a block circuit diagram of an arrangement for the production of a television signal according to the invention.
Figure 47:
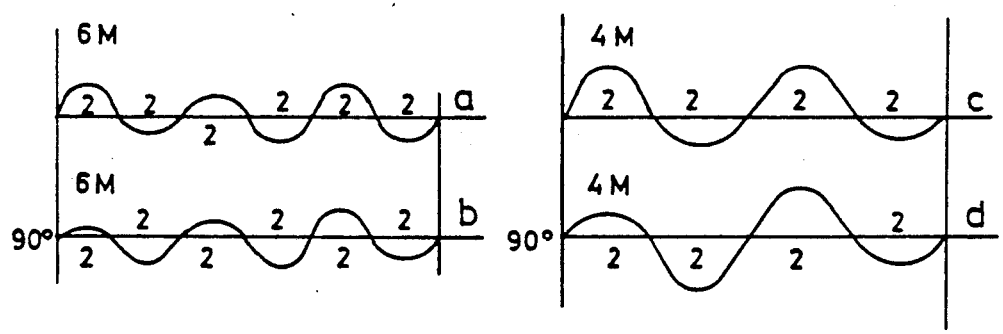
FIG. 47 shows code alternating currents which arise in a method according to the invention.

In FIG. 46 there is shown schematically a TV transmitter, in which all signals are digitally coded and transmitted. A TV camera FK delivers the red-, the blue-, and the green-signal R, B, G. In a Y-Matrix YM a luminance signal Y is produced, which is transformed with a sampling frequency of 6 MHz into PAM-pulses. These pulses are then later translated into a PCM-code. A four-step code corresponding to FIG. 6 may be provided. In one period four bits will then be provided for. If 8 bits are used, it is desirable not to use the doubled frequency for the code alternating current, but rather code alternating currents each with 6 MHz, which are shifted in phase by 90° with respect to each other, so that they can later be added. In FIGS. 47a and b such code alternating currents are shown. Only 4 MHz are required for the encoding of the color—and tone-signals. For these the same code is used. Since one sample is coded with 8 bits, there is required for each one period of the sinusoidal code signal in the code alternating current (see also FIG. 37). For the taking of three Y-samples a sample is taken for the color hues in the present preferred example. Since the encoding is done digitally, the value cannot be fixed until the end of the code word. In order to keep the luminance signal Y synchronous with the color signals at the TV picture tube of the receiver apparatus, the coded Y-signal must be stored long enough for the color hue signals to be evaluated. For this purpose memories Vz1 and Vz2 for the PCM-signals are provided in the circuit arrangement according to FIG. 46. The transformation of the PAM-signals into PCM-signals is done in a code converter PAM/PCM. The delayed PCM-signals are transformed in phase-shifters W1, W2 into code alternating currents with a simultaneous phase shift of 90°, as shown in FIGS. 47a and 47b and summed in a first adder YAD. The color signals red and blue are picked up with a frequency of 2 MHz and the resulting PAM-pulses are transformed in two further PAM/PCM-re-coders into 8 MHz PCM-pulses and led to a transducer W4 or W3 respectively, in which then a code alternating current with a frequency of 4 MHz is constructed. Each half wave represents again 2 bits. A tone signal T is added to the blue-signal. As FIG. 47d shows, the two bits of the last half wave are provided for tone and control signals. The two color code alternating currents are equally phase-shifted by 90° with respect to each other and are added in a second adder CAd. The two sum alternating currents of the adder (i.e. the luminance—, color-, and tone signals) are led via a coupler E to a sending modulator MO, which is coupled with a carrier oscillator OSC. The modulated carrier is amplified as usual in an end amplifier (not shown) and radiated by an antenna. One can also, as is shown in FIG. 48, encode the color signals equally with 6 MHz. The bits which are not used can then be used for other purposes. In this case there arises the possibility, of providing a double summation without carrier-frequency intermediate steps. The simulataneous phase shifts are then 0°, 90°, 90°, 180°. In the first addition the sum alternating currents then have phase shifts of 45° and 135°. These are then again shifted in phase by 90° with respect to each other, so that an additional summation is possible.

With respect to FIG. 46 it should still be mentioned that sample signals AS are still led to the PAM coder PAM. The coded tone signals must be transformed continuously into tones at the receiver with intermediate storage.

In the case of TV one can transmit all signals serially and transmit several channels simultaneously by QAM or double-QAM. In FIG. 8 or 6 respectively the characteristic states are so laid that the smallest lies substantially over the noise level. The characteristic states need not all have equal spacing; the spacings can be smaller after large amplitudes. The storage according to FIG. 41 can also be used for digital values.

I claim:

1. Process for the simultaneous transmission of first information from a first to a second station and of second information from the second to the first station over a single transmission path, comprising the following steps:

carrying out the following steps in said first station:
(a) producing an essentially sinusoidal first signal having a predetermined frequency as well as a predetermined phase and consists of a sequence of oscillation periods each of which at any given time contains two half-waves following one another with predetermined duration and opposite polarity, wherein said half-waves are able to take on at least two different discrete amplitude values which set forth a code representing said first information, and wherein all amplitude values are greater than zero,
(b) transmitting said first signal from said first station to said second station over said single transmission path, carrying out the following steps in said second station: (a) obtaining a second sinusoidal oscillation having said predetermined frequency and phase by passing the transmitted first signal through separation means, (b) decoding the transmitted first signal in order to retrieve said first information, (c) feeding said second sinusoidal oscillation as an input signal into a 90-degree-phase shifter, which delivers an output signal, phase shifted by 90 degrees with respect to said input signal and thus shifting the phase of said second sinusoidal oscillation by 90 degrees, (d) producing an essentially sinusoidal second signal out of the phase-shifted second oscillation, wherein said second signal has the phase of the phase-shifted second oscillation and the predetermined frequency and consists of a sequence of oscillation-periods, each of which at any given time contains two half-waves following on each other with predetermined duration and opposite polarities, wherein said half-waves are able to take on at least two different discrete amplitudes, which set forth a code representing said second information, and wherein all amplitude values are greater than zero, (e) transmitting said second signal over said single transmission path to said first station, and carrying out the following step in said first station: decoding the transmitted second signal in order to retrieve said second information.

2. Process according to claim 1 comprising the following additional step in said second station: compensating (58, FIG. 3) the signal to be transmitted by the signal received.

3. Process according to claim 1, wherein said transmission path includes a wireless transmission path.

4. Process for the simultaneous transmission of first information from a first to a second station and of second information from the second to the first station over a single transmission path, comprising the following steps:

carrying out the following steps in said first station: (a) producing an essentially sinusoidal first signal having a predetermined frequency as well as a predetermined phase and consists of a sequence of oscillation periods each of which at any given time contains two half-waves following one another with predetermined duration and opposite polarity, wherein said half-waves are able to take on at least two different discrete amplitude values which set forth a code representing said first information, and wherein all amplitude values are greater than zero, (b) transmitting said first signal from said first station to said second station over said single transmission path, carrying out the following steps in said second station: (a) obtaining a second sinusoidal oscillation having said predetermined frequency and phase by a resistance-arrangement adapted to apportion the transmitted first signal, (b) decoding the transmitted first signal in order to retrieve said first information, (c) feeding said second sinusoidal oscillation as an input signal into a 90-degree-phase shifter, which delivers an output signal, phase shifted by 90 degrees with respect to said input signal and thus shifting the phase of said second sinusoidal oscillation by 90 degrees, (d) producing an essentially sinusoidal second signal out of the phase-shifted second oscillation, wherein said second signal has the phase of the phase-shifted second oscillation and the predetermined frequency and consists of a sequence of oscillation-periods, each of which at any given time contains two half-waves following on each other with predetermined duration and opposite polarities, wherein said half-waves are able to take on at least two different discrete amplitudes, which set forth a code representing said second information, and wherein all amplitude values are greater than zero, (e) transmitting said second signal over said single transmission path to said first station, and carrying out the following step in said first station: decoding the transmitted second signal in order to retrieve said second information.

5. Process according to claim 4, wherein said transmission path includes a wireless transmission path.

6. Process for the transmission of information from several subscribers over an appropriate connection to a transfer system, comprising the following steps: (a) translating information which is to be transmitted form one predetermined subscriber on the transfer system into a coded alternating current signal in which at least one of two half-waves of each period forms a code element of a code setting forth said information, (b) translating information which is to be transmitted from the transfer system to a predetermined subscriber into a coded alternating current signal in which at least one of two half-waves of each period forms a code element of a code setting forth said information, (c) synchronizing the coded alternating current signal from one subscriber and the coded alternating current signal from the transfer system so that said signals have a relative phase displacement of 90 degrees by passing the coded alternating current signal from one subscriber or the coded alternating current signal from the transfer system through a phase shifter, (d) selectively receiving the coded alternating current signal transmitted from the transfer system to the subscriber at the location of the subscriber, (e) decoding the coded alternating current signal transmitted from the transfer system to a predetermined subscriber and at the location of this subscriber, (f) selectively receiving the coded alternating current signal transmitted from the subscriber to the transfer system at the location of the transfer system, and (g) decoding the coded alternating current signal transmitted from the subscriber to the transfer system.

7. Process according to claim 6, wherein the selection of the coded alternating current signal is accomplished by passing the coded alternating current signals through fork-circuits.

8. Process according to claim 6 comprising the additional step of compensating the signal to be transmitted to said subscriber by the signal received from said subscriber.

9. The process according to claim 6 wherein the selection of the coded alternating current signal is accomplished by passing the coded alternating current signals through resistor means.

10. Process for the coded transmission of several information signals via a common transmission path in which each information signal is transformed into a code alternating current of a predetermined frequency, wherein the code alternating currents contain code elements which consist of at least one half wave of the code alternating current;

two code alternating currents are added with a mutual phase shift of 90°, in order to produce a sum alternating current with a predetermined phase state;

the sum alternating current is combined with a further coded alternating current, which is shifted in phase by 90° with respect to that of the sum alternating current; and the combined coded alternating current is transmitted;

wherein the production of a code alternating current includes the following steps: (a) producing a clock-signal with a period which is equal to the duration of a predetermined incremental change in the half-wave duration, (b) applying the clock-signal to a counter with controllable start-time and counting the clock-signal by means of the counter, (c) selectively sampling output signals from the counter to selectively determine the duration of the running half-wave of the alternating current, (d) applying the sampled output signals to a bi-stable switch-means which delivers a square-wave signal having axis crossings corresponding to the arrival of successive sampled signals from the counter and half-cycle durations determined in accordance with the selection of the sampling signals, (e) resetting the counter by the counter-output signal, (f) controlling the amplitude of the half-waves of the square-wave signal depending upon the information to be transmitted, and (g) transforming the square-wave voltage produced from the switch means into a sinusoidal signal.

11. Process for the transmission of information in four information channels, wherein the information is presented by means of an essentially sinusoidal first, second, third and fourth code alternating currents, which have a predetermined frequency and consist of a sequence of oscillation periods which at any given time contain two successive half-waves with predetermined duration and opposite polarity, wherein the half-waves are capable of assuming at least two different discrete amplitude values which form a code which represents the information of the pertinent channel, said process comprising the following steps: (a) adding the first and the second code alternating currents with a mutual phase shift of 90 degrees for the production of a first sum code alternating current, (b) adding the third and the fourth code alternating currents with a mutual phase shift of 90 degrees for the production of a second sum code alternating current, (c) adding the first and second sum code alternating currents with a mutual phase shift of 90 degrees for the production of a combined sum code alternating current, and (d) transmitting the combined sum code alternating current.

12. Process according to claim 11, wherein the first and second information channels contain a luminance portion of a color-TV signal, wherein the third information channel contains a first color signal and wherein the fourth information channel contains a second color signal as a tint signal.

13. Process according to claim 11, wherein the transmitted sum code alternating currents are sampled at points which are displaced in phase 45 degrees before and after a zero-crossing of the sum code alternating current, which points are ascertained by counting of measurement impulses.

14. Process according to claim 11, wherein the decoding of the code alternating currents is accomplished by: (a) producing comparison signals representative of every possible code-combination corresponding to the half-waves of distinguishable amplitudes, and (b) subtractively mixing the transmitted combined sum code alternating current with each one of the comparison signals, the existence of a particular code combination being recognized by the subtractive cancelation of the corresponding comparison signal.

15. Process for the coded transmission of a color-TV signal, which contains a luminance component, first and second color components and additional signal components, comprising the following steps: (a) producing a first code alternating current which has a predetermined frequency and consists of a sequence of oscillation periods which contain at any given time two half-waves of opposite polarity, (b) producing a second code alternating current which has the predetermined frequency and consists of a sequence of oscillation periods which contain at any given time two half-waves of opposite polarity, wherein the amplitudes of the half-waves of said first and second code alternating currents represent the luminance component, (c) producing a third code alternating current which has the predetermined frequency and consists of a sequence of periods which at any given time contain two half-waves of opposite polarity, wherein the half-waves of the third code alternating current are capable of taking on at least two discrete, differing amplitude values which form a digital code which represents at least the first color signal component, (d) producing a fourth code alternating current which has the predetermined frequency and consists of periods which at any given time contain two half-waves of opposite polarity which form a digital code which represents at least the second color component, (e) adding the first and second code alternating currents with a mutual phase shift of 90 degrees in order to produce a first sum code alternating current, (f) adding said third and fourth code alternating currents with a mutual phase shift of 90 degrees in order to produce a second sum alternating current, (g) adding the first and second sum code alternating currents with a mutual phase shift of 90 degrees in order to produce a combined code alternating current, and (h) transmitting the combined code alternating current.

16. Process according to claim 15, wherein the transmitted sum code alternating currents are sampled at points which are displaced in phase 45 degrees before and after a zero-crossing of the sum code alternating current, which points are ascertained by counting of measurement impulses.

17. Process according to claim 15, wherein the decoding of the code alternating currents is accomplished by: (a) producing comparison signals representative of every possible code-combination corresponding to the half-waves of distinguishable amplitudes, and (b) subtractively mixing the transmitted combined sum code alternating current with each one of the comparison signals, the existence of a particular code combination being recognized by the subtractive cancelation of the corresponding comparison signal.

18. Process for the coded transmission of several information signals via a common transmission path in which each information signal is transformed into a code alternating current of a predetermined frequency, wherein the code alternating currents contain code elements which consist of at least one half wave of the code alternating current;

two code alternating currents are added with a mutual phase shift of 90°, in order to produce a sum alternating current with a predetermined phase state;

the sum alternating current is combined with a further coded alternating current, which is shifted in phase by 90° with respect to that of the sum alternating current; and the combined coded alternating current is transmitted;

wherein the code elements which are formed by half-waves of a predetermined first polarity of a first of said alternating currents represent a first stereo-signal and the code elements which are formed by half-waves of a second polarity of said first alternating current opposed to the first polarity represent a second stereosignal.

19. Process for the simultaneous transmission of first information from a first to a second station and of second information from the second to the first station over a single transmission path, comprising the following steps:

carrying out the following steps in said first station:
    (a) producing an essentially sinusoidal first signal having a predetermined frequency as well as a predetermined phase and consists of a sequence of oscillation periods each of which at any given time contains two half-waves following one another with predetermined duration and opposite polarity, wherein said half-waves are able to take on at least two different discrete amplitude values which set forth a code representing said first information, and wherein all amplitude values are greater than zero, (b) transmitting said first signal from said first station to said second station over said single transmission path, carrying out the following steps in said second station: (a) obtaining a second sinusoidal oscillation having said predetermined frequency and phase by passing the transmitted first signal through a fork circuit, (termination circuit) (b) decoding the transmitted first signal in order to retrieve said first information, (c) feeding said second sinusoidal oscillation as an input signal into a 90-degree-phase shifter, which delivers an output signal, phase shifted by 90 degrees with respect to said input signal and thus shifting the phase of said second sinusoidal oscillation by 90 degrees, (d) producing an essentially sinusoidal second signal out of the phase-shifted second oscillation, wherein said second signal has the phase of the phase-shifted second oscillation and the predetermined frequency and consists of a sequence of oscillation-periods, each of which at any given time contains two halfwaves following on each other with predetermined duration and opposite polarities, wherein said half-waves are able to take on at least two different discrete amplitudes, which set forth a code representing said second information, and wherein all amplitude values are greater than zero, (e) transmitting said second signal over said single transmission path to said first station, and carrying out the following step in said first station: decoding the transmitted second signal in order to retrieve said second information.

20. Process according to claim 19 comprising the following additional step in said second station: compensating the signal to be transmitted by the signal received.

21. Process for transmission of information in three information-channels, wherein the information is presented by means of an essentially sinusoidal first, second and third code alternating currents, which have a predetermined frequency and consist of a sequence of oscillation periods which at any given time contain two successive half-waves with predetermined duration and opposite polarities, wherein the half-waves are capable of taking on at least two different discrete amplitude values which form a code which represents the information of the pertinent channel, said process comprising the following steps: (a) adding the first and the second code alternating currents with a mutual phase shift of 90 degrees for the production of a sum code alternating current, (b) adding the sum code alternating current and the third code alternating current with a mutual phase shift of 90 degrees for the production of a combined code alternating current, and (c) transmitting the combined code alternating current.

* * * * *